April 12, 1932. W. V. N POWELSON ET AL 1,853,376
AIRSHIP
Filed Sept. 6, 1921  14 Sheets-Sheet 1
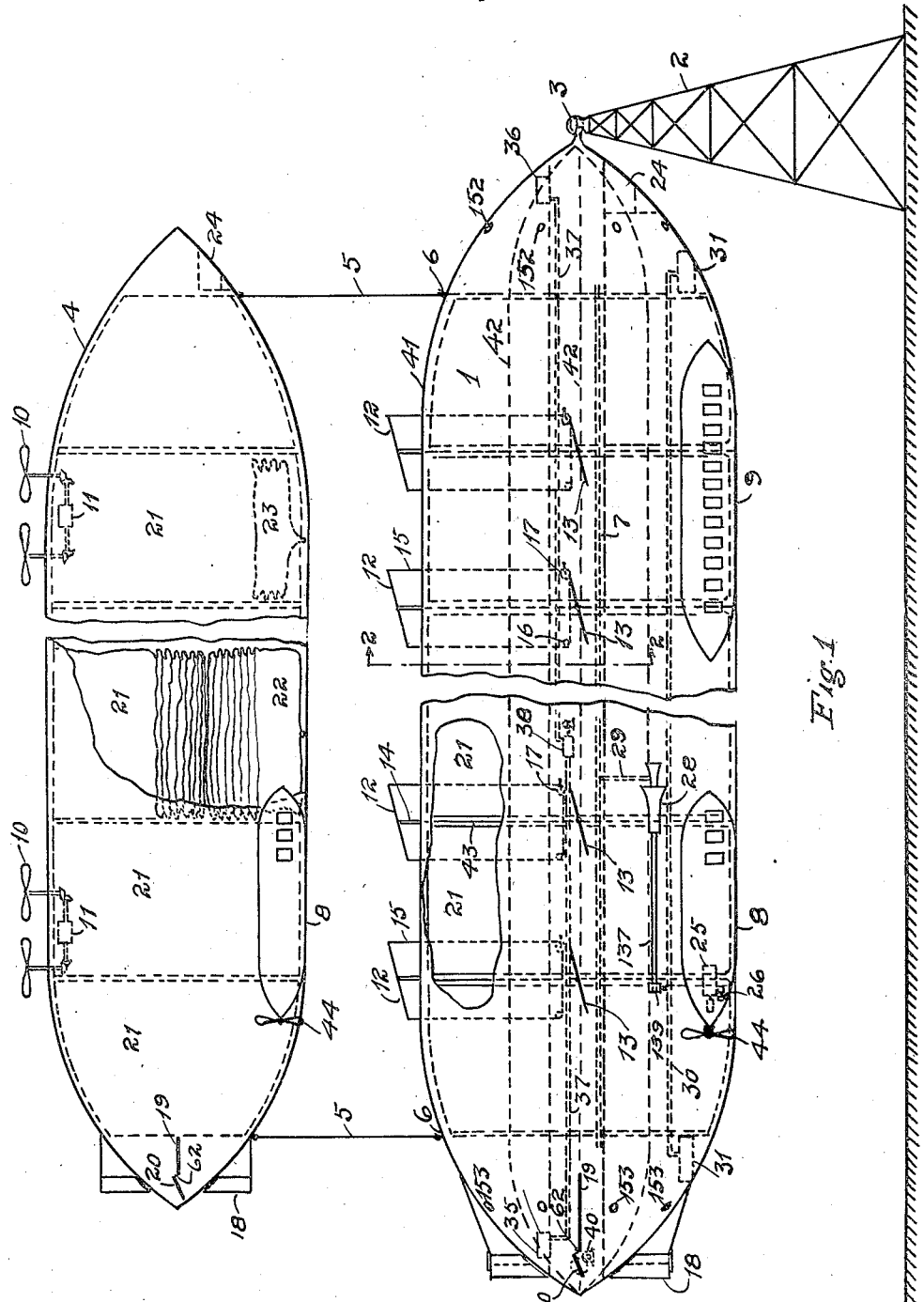
INVENTORS:
WILFRID V.N. POWELSON
WARREN TRAVELL
BY Mitchell, Chadwick & Kent, Attys.

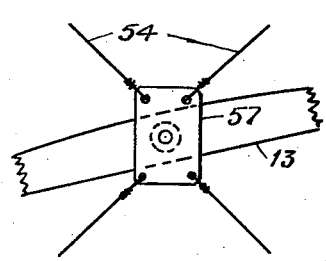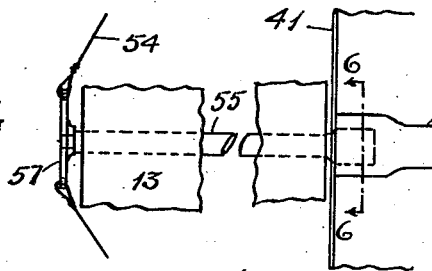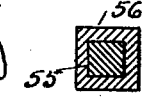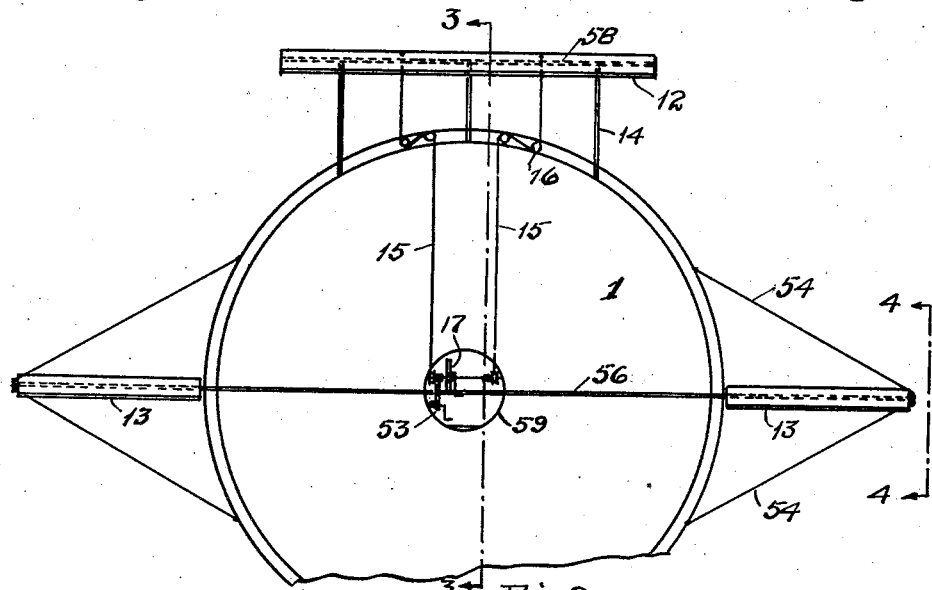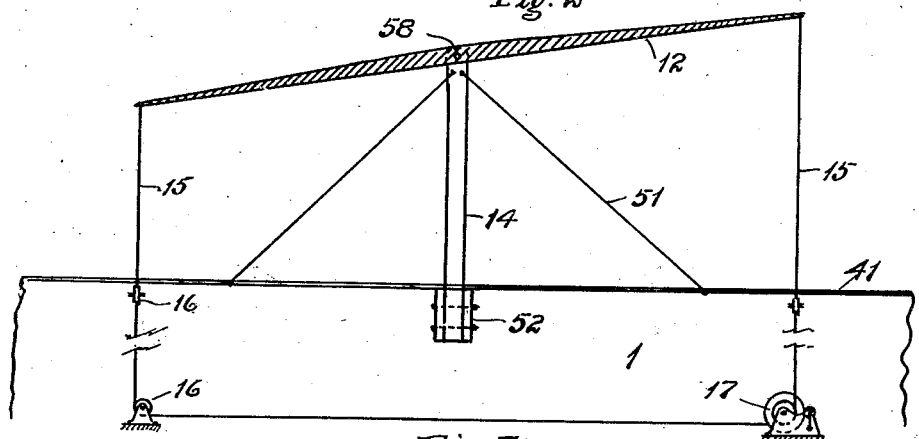

April 12, 1932. W. V N POWELSON ET AL 1,853,376
AIRSHIP
Filed Sept. 6, 1921 14 Sheets-Sheet 3
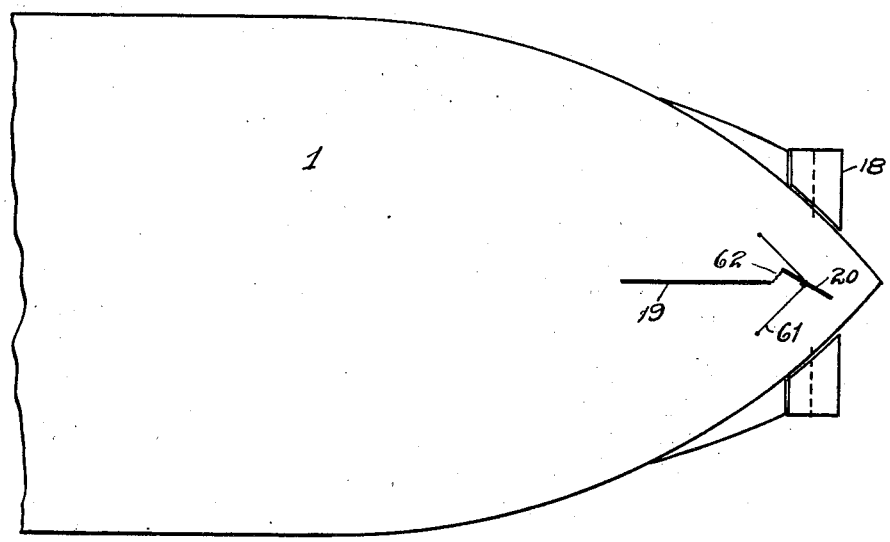
Fig. 7
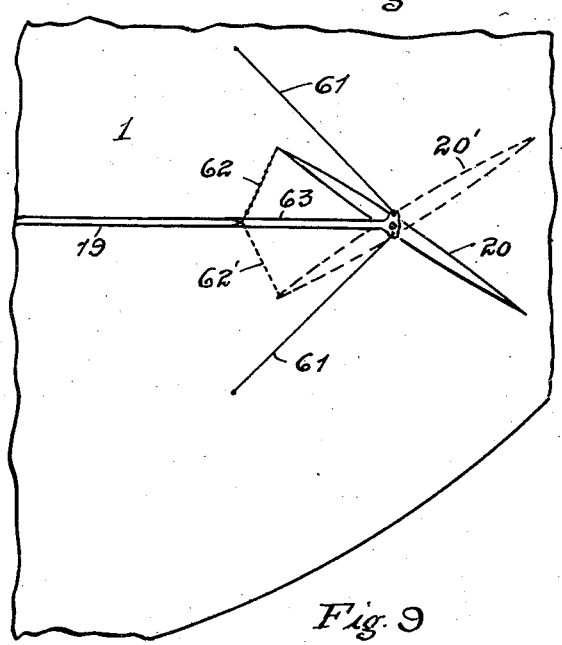
Fig. 9
Fig. 8
INVENTORS:
WILFRID V.N. POWELSON
WARREN TRAVELL
BY Mitchell, Chadwick Kent,
Attys.

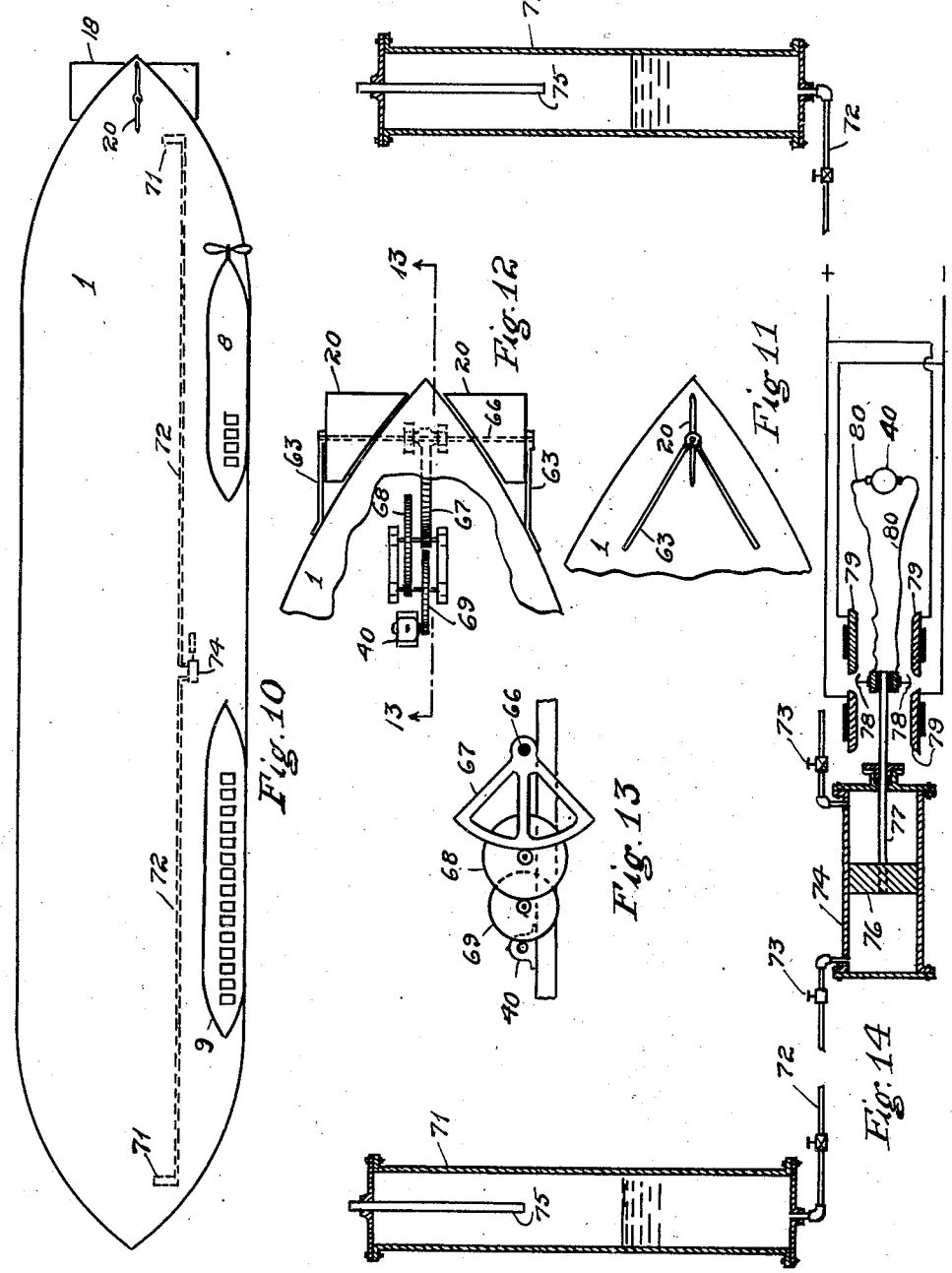

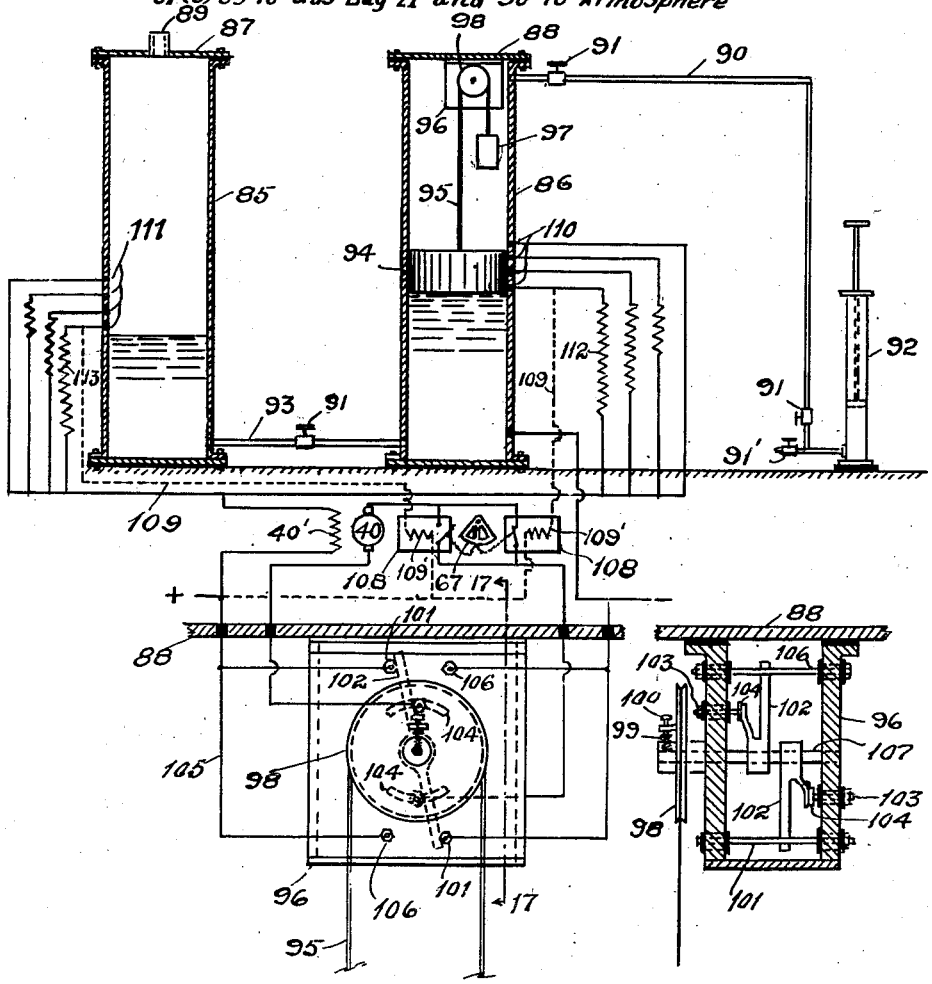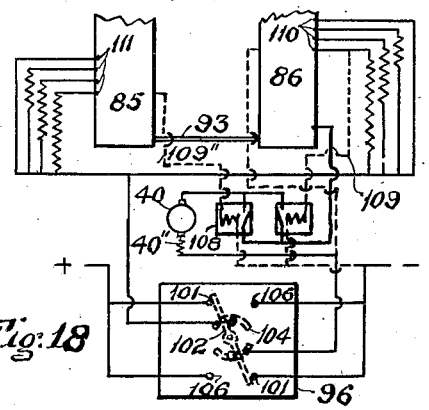

April 12, 1932.  W. V. N POWELSON ET AL  1,853,376
AIRSHIP
Filed Sept. 6, 1921  14 Sheets-Sheet 6
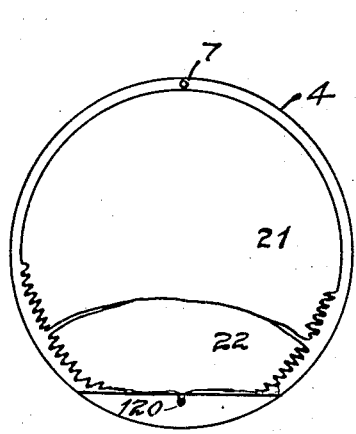
Fig. 19
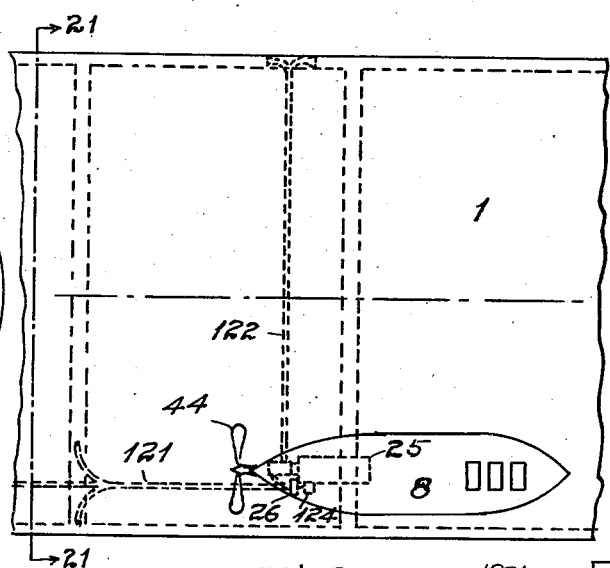
Fig. 20
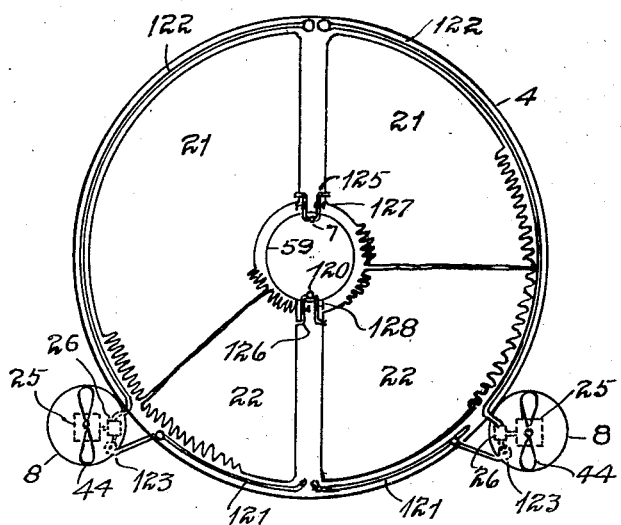
Fig. 21
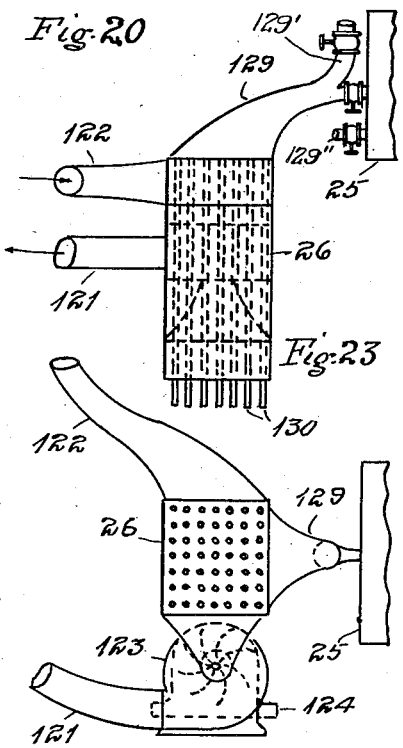
Fig. 23
Fig. 22
INVENTORS:
WILFRID V. N. POWELSON
WARREN TRAVELL
BY Mitchell, Chadwick & Kent,
Attys.

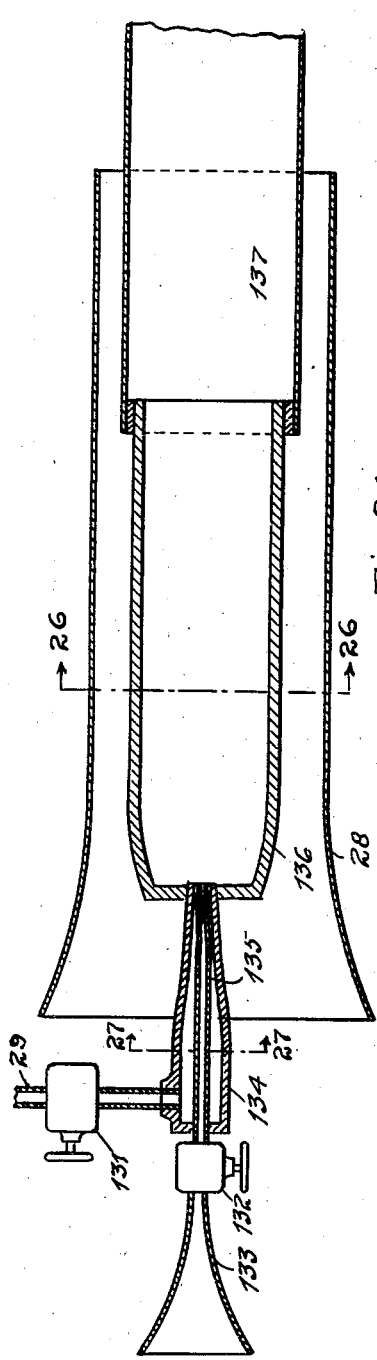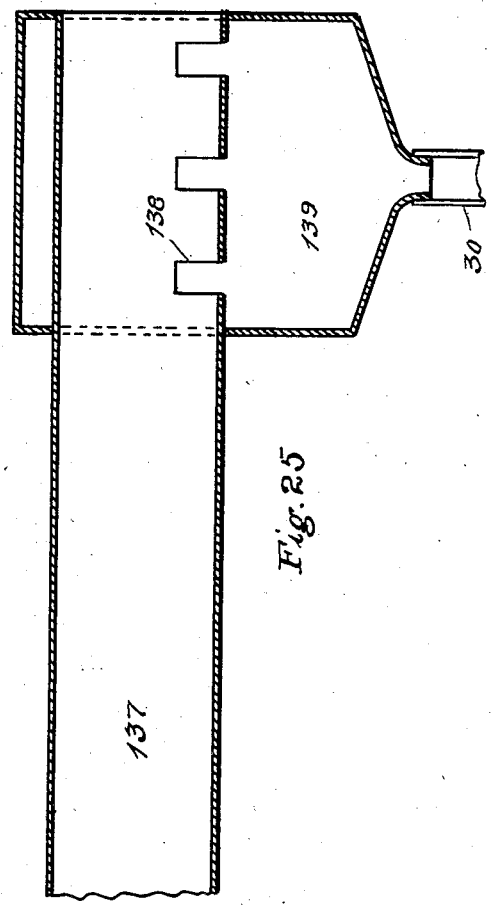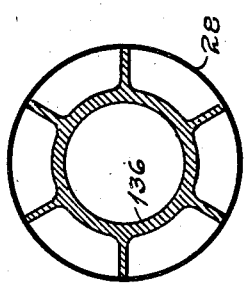

April 12, 1932. W. V. N POWELSON ET AL 1,853,376
AIRSHIP
Filed Sept. 6, 1921 14 Sheets-Sheet 8

INVENTORS:
WILFRID V. N. POWELSON
WARREN TRAVELL
BY
Mitchell, Chadwick & Kent,
Attys.

INVENTORS:
WILFRID V. N. POWELSON
WARREN TRAVELL
BY Mitchell, Chadwick & Kent,
attys.

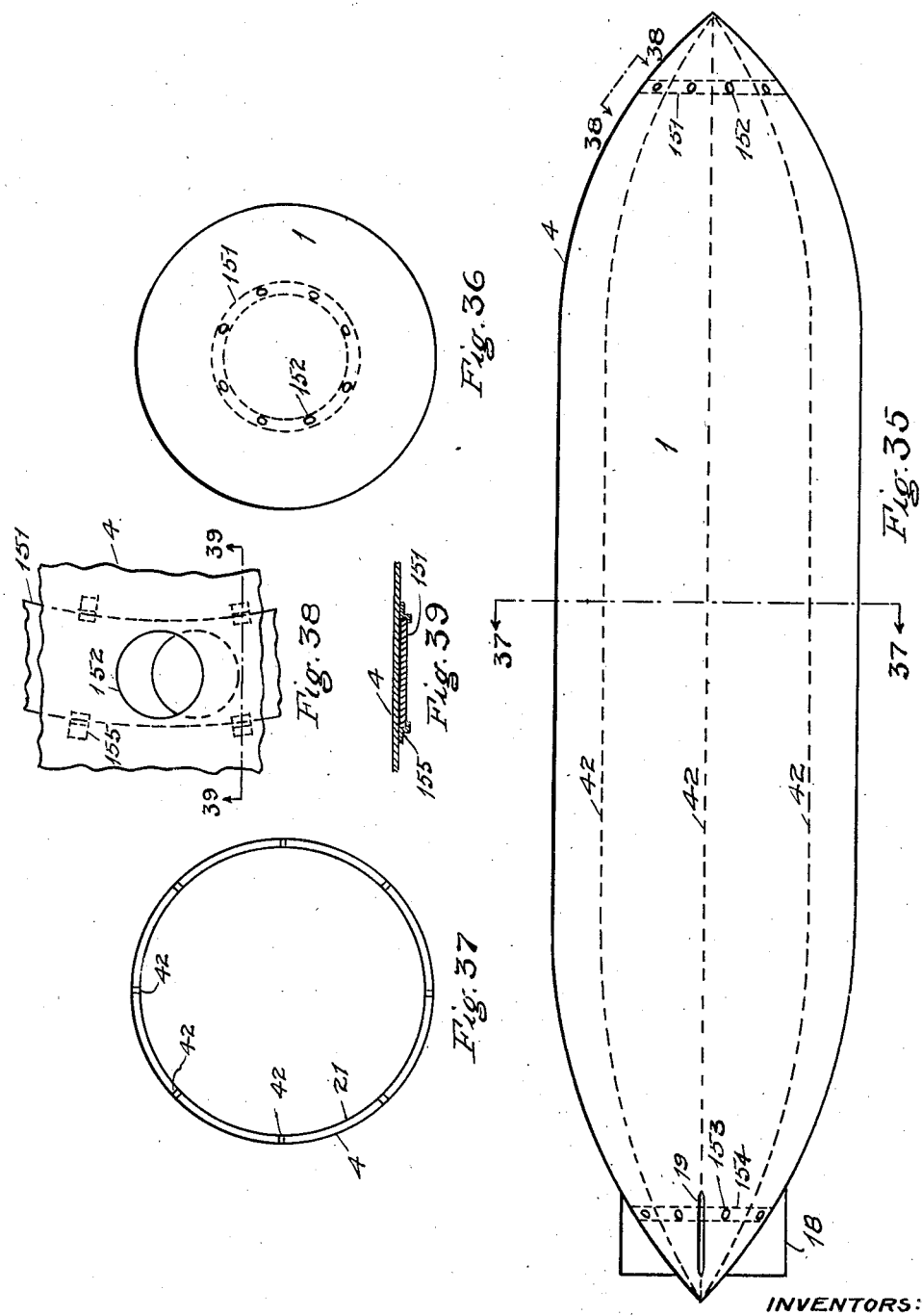

April 12, 1932. W. V. N POWELSON ET AL 1,853,376
AIRSHIP
Filed Sept. 6, 1921 14 Sheets-Sheet 12
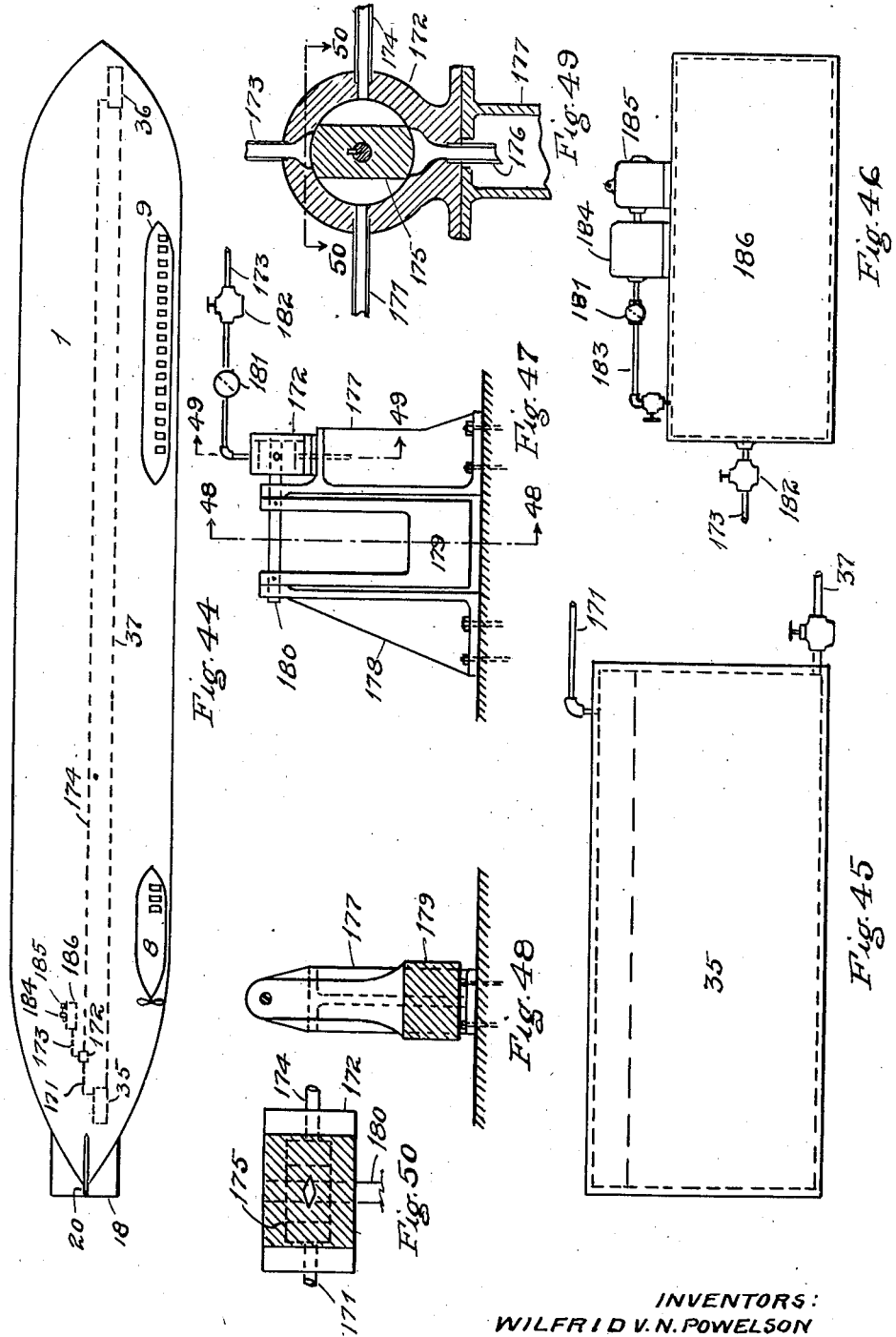
INVENTORS:
WILFRID V.N. POWELSON
WARREN TRAVELL
BY Mitchell, Chadwick & Kent, Attys.

April 12, 1932.   W. V. N POWELSON ET AL   1,853,376
AIRSHIP
Filed Sept. 6, 1921   14 Sheets-Sheet 13
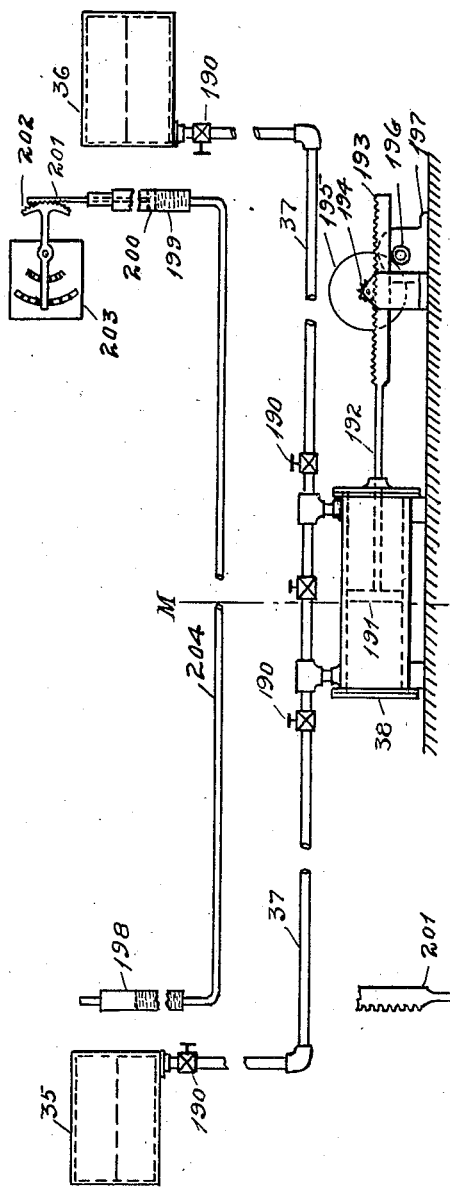
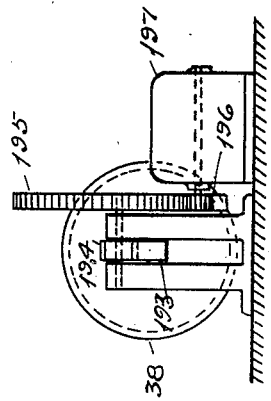
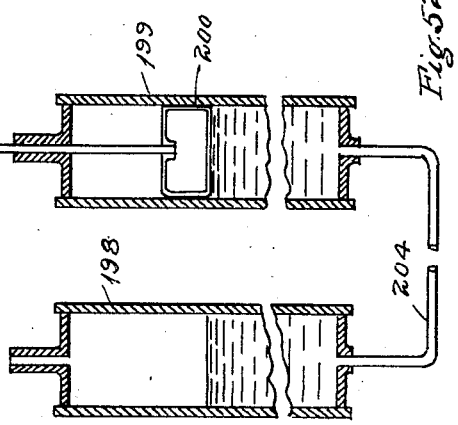
INVENTORS:
WILFRID V. N. POWELSON
WARREN TRAVELL
BY Mitchell, Chadwick & Kent
Attys.

April 12, 1932. W. V. N POWELSON ET AL 1,853,376
AIRSHIP
Filed Sept. 6, 1921 14 Sheets-Sheet 14
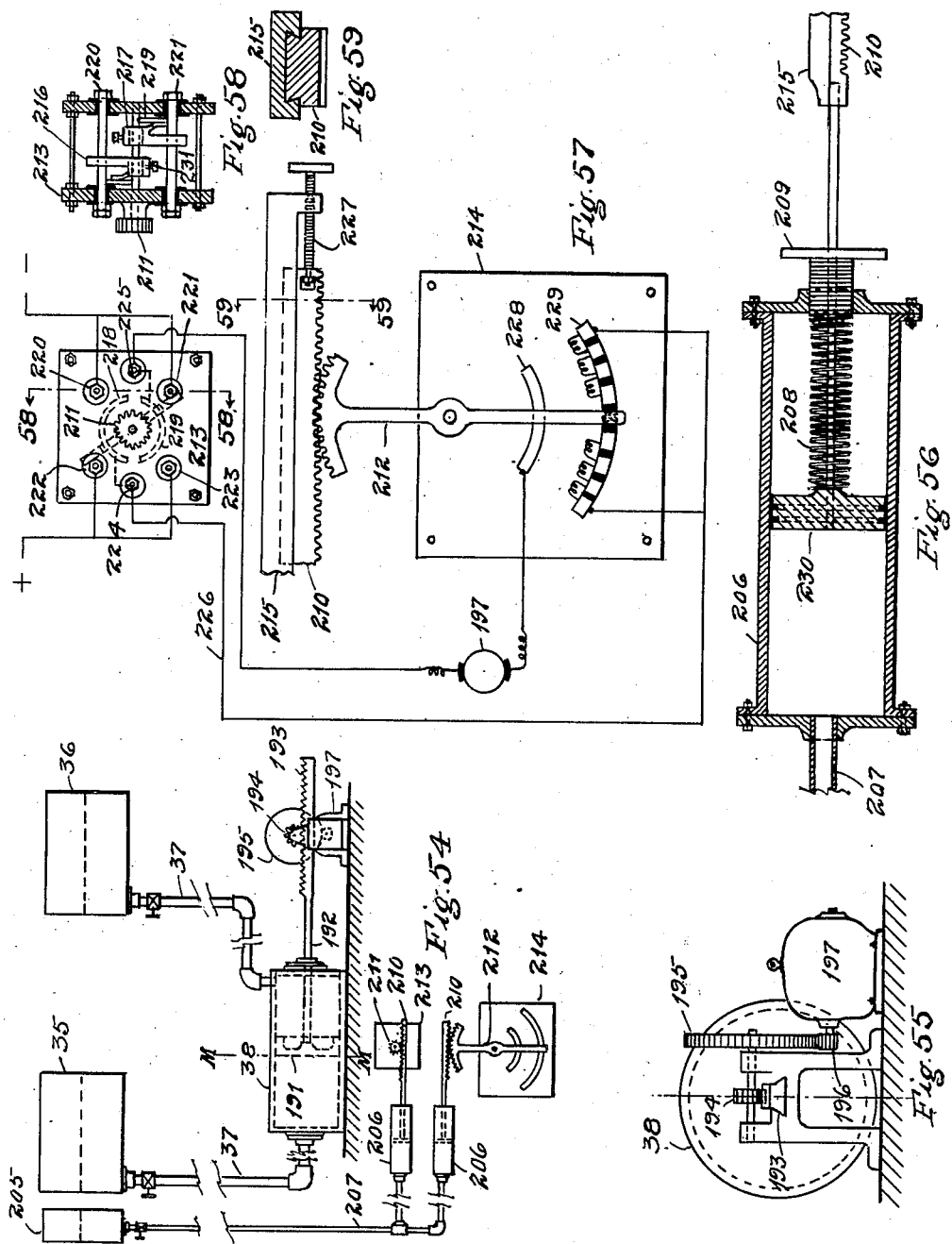
INVENTORS:
WILFRID V.N. POWELSON
WARREN TRAVELL
BY Mitchell, Chadwick & Kent
Attys.

Patented Apr. 12, 1932

1,853,376

UNITED STATES PATENT OFFICE

WILFRID V. N. POWELSON AND WARREN TRAVELL, OF NEW YORK, N. Y.

AIRSHIP

Application filed September 6, 1921. Serial No. 498,605.

The invention relates to improvements in airships.

The development of large airships of the lighter-than-air type has proceeded so far that they are recognized as practicable; but the most advanced of such ships, so far as we are aware, fall short of being commercially practicable, except for short distance pleasure trips for passengers, and of attaining those standards of cargo carrying capacity (freight and passengers), efficiency, safety and economy which may be considered reasonable and which it is the object of this invention to provide.

With respect to carrying capacity, the invention herein set forth provides means for multiplying many times the useful load that could be carried in a ship of equal size made according to the best principles heretofore known; and in particular, it provides for carrying a load of passengers, cargo and supplies substantially heavier than the weight that can be lifted by the full volume of lifting gas that is or can be contained on board.

As regards efficiency and economy it provides for the reduction of the quantity of flight gas consumed during the voyage and the reduction of the fuel consumption per unit of useful weight transported at equal speed, each to a large degree, and at the same time improves the handling of the ship in flight, giving to such a ship when used for military purposes a maximum "ceiling" (attainable altitude above the ground) affording unquestioned superiority over an antagonist with less "ceiling". It improves the efficiency and safety when such ship is used for military purposes by affording an efficient dynamic lift to replace static lift lost by piercing of the gas bags by projectiles.

The invention also provides for flying at a constant altitude and on an even horizontal keel without the necessity to discharge gas or ballast, a result that, so far as we are aware, has never been accomplished heretofore. This is accomplished by varying the angle of incidence of the aerofoils attached to the airship so as to produce upon the airship without the assistance of the horizontal rudder an exact balance in the vertical forces acting on the airship, and a balance between the various couples acting on the airship, tending to turn it in a vertical plane, so nearly exact that the automatic stabilizer hereinafter described will maintain the keel of the airship in a horizontal position. The angle of incidence of the aerofoils may be so varied as to produce a wide variation in the dynamic vertical force acting on the airship even converting its from an upward into a downward force when desired, and accomplishing this result without displacing the keel or the horizontal rudder from the normal horizontal positions.

The loss of gas from the fragile gas bags, particularly of rigid airships, from expansion due to the heating effect of the direct rays of the sun is a serious matter in the present state of the art. Aerofoils over the body of the airship provide shade at the same time that they provide dynamic lift. While the production of dynamic lift is their primary function, the shading of the body is an important, although incidental, benefit.

As regards efficiency of propulsion through the air the invention provides for the convenient automatic stabilization of the airship in a horizontal position during flight, both while flying at a constant altitude and when changing altitude,—no change in the horizontal position being necessary to accomplish these objects. For passenger service these are very important advantages. Also the invention provides for the automatic stabilization of the airship, at the will of the operator, at any desired angle of inclination during climbing or descending, so that the inclination of the longitudinal axis of the airship may be maintained during climbing and descending at the same angle as the true line of flight. This permits motion in the true line of flight at an increased speed and is an important advantage in military operations. The result of maintaining the longitudinal axis parallel to the true line of flight is to give the maximum advantage to the stream line body of the airship, thereby reducing to a minimum the resistance of the body to motion in the true line of flight. When the ship is required to fly, as in the present state of the art, with its body making a substantial angle with the true line of flight, the resistance of the body to forward motion is enormously increased and the speed is reduced.

As regards safety, an important advantage of the invention is that in case the horizontal rudder becomes jammed in a position displaced from its mid normal position, thereby tending to cause the airship to make a loop in a vertical plane that would result in throwing overboard passengers and crew, one or more of the aerofoils may be set at such an angle of incidence as to introduce a turning couple acting on the airship that will completely balance and neutralize the dangerous turning couple produced by the jammed rudder.

In military operations the shooting away of the horizontal rudder or of its guide plane would put the airship out of control, in the present state of the art. An airship equipped with the invention herein set forth can by varying the angle of incidence of the aerofoils be controlled in a vertical plane without the use of the horizontal rudder and even when the horizontal rudder is wrecked and jammed in an otherwise dangerous position. The primary use of the aerofoils is to produce dynamic lift and their use to give safety to the airship in case of accident to the horizontal rudder or to provide additional lift at the proper place and in the proper amount in case a gas bag is punctured is an incidental but important benefit.

Other advantages that follow from the invention are too numerous to mention, but some of them appear hereinafter. These various results are attained by the combination of sundry features, the principles and illustrative details of which are set forth hereinafter. Among these are the provision of dynamic lift by which the static lifting power of the lifting gas is supplemented; the application of this dynamic lift at two points separated from each other, one forward and the other aft of the centers of buoyancy and of gravity, whereby this dynamic lift can be used for maintaining the forward and aft parts of the ship at desired levels relative to each other; and the provision of automatic means for thus controlling the angle the keel makes with the horizontal, according to a predetermined standard, which may be varied by the navigator at will.

The invention also comprises means to make ballast en route by fixing oxygen from the air on board for drinking and cooking and for other purposes, including ballast, using for this purpose hydrogen which has hitherto been necessarily released and wasted because of relative increase of buoyancy with the gradual reduction of fuel weight on board which occurs as the flight proceeds. Another feature is the provision of means to maintain the quality of the hydrogen, helium, or other lifting gas on board by preventing that infiltration of air which under present practice after a time reduces the lifting power, so as to make it impracticable for a long flight, and to require replacement by a fresh charge of purer gas.

These various objects of the invention and the other advantages which characterize or follow from its use are attained by providing an airship, which may be of the ordinary rigid type, of any ordinary or suitable size and construction, provided with lighter-than-air gas for lifting, with novel features of construction and incidental operating apparatus, the general character of which will be understood from the following brief description of a ship embodying the invention. It is to be understood that for convenience the term "gas" is used herein as meaning any lighter-than-air gas which is used for lifting purposes on an airship except the less valuable gas used during the initial ascent to cruising altitude as hereinafter described, hydrogen being the gas at present most commonly used, as distinguished from air, which also is used in gaseous form in connection with the lifting gas.

A ship embodying the invention may have the usual rigid frame, with successive compartments, each containing a light gas-holding bag within an envelope, the latter being surrounded at a little distance by a large envelope which covers the body of the ship as a unit and preferably being also at a little distance from its individual compartment walls. According to the invention, the gas is made an active element for certain qualities which may be varied from time to time in the operation of the ship. In a typical instance, the gas containers in a ship located at a landing and about to begin a flight, may be furnished with gas at a predetermined temperature different from the local atmospheric temperature at the place where the ship is,— under certain circumstances at a higher temperature, and under others at a temperature below the local atmospheric temperature, as may be required by circumstances.

A quantity of such gas is provided, distributed through the containers, and sufficient only to partly fill said containers. The balance of the space within the airship occupied normally by gas when the said gas containers are full at the cruising altitude, is at the moment of ascent occupied by air or by a lifting gas of less valuable quality than the gas used in flight. Such air or such less valuable gas is confined in one or more flexible containers, so situated that when said air or less valuable gas is given a pressure slightly above that of the surrounding atmosphere it will cause the pressure of the cruising gas to rise slightly above that of the atmosphere. Means are provided to keep said air or said less valuable gas at a pressure slightly above that of the atmosphere, and automatic blow-off valves are provided on both the gas container and the container for said air or less valuable gas, the valves on the gas containers being set to blow off at a small pressure above that of the surrounding atmosphere but yet at a higher pressure than the blow-off valves in the container of said air or said less valuable gas.

The result is that when the pressure of the atmosphere decreases, as is experienced in rising from the ground to cruising altitude, the expansion of the cruising gas will not result in the discharge of such gas into the atmosphere until all the less valuable gas has been discharged into the atmosphere. By using a heated, less valuable lifting gas for a portion of the initial static lift in a container so fitted that it will be automatically discharged into the atmosphere during ascent before any more valuable cruising gas is discharged, an important advantage is gained. Always maintaining during flight a slight pressure above atmosphere in those containers which hold air or less valuable gas at the moment of ascent, will prevent, or substantially reduce, osmosis of air into the cruising gas, because the cruising gas container will thus be maintained during flight having at all times a slight pressure above that of the surrounding atmosphere.

By rising for flight with the cruising gas at the temperature of the cruising altitude and in that amount which at the pressure of the cruising altitude will just fill the gas containers, the airship will on reaching the initial cruising altitude be in the best possible condition to continue the voyage at that altitude and to conserve its gas and buoyancy by maintaining by the heating and cooling means herein described a substantially constant temperature of gas. Thus the airship can proceed at constant altitude with its gas bags full of cruising gas and under a slight pressure at all times to maintain its purity. As the airship was, by hypothesis, according to the preferred arrangement, on reaching the initial cruising altitude statically heavy,—viz., weighing more than the static lift of its gas bags when full of gas,— it follows that in order to correct for the loss of weight due to fuel consumption, it will not be necessary, as in the present state of the art, to discharge valuable cruising gas into the air.

As weight is lost, it will be necessary by this invention merely to decrease the dynamic lift, and this is accomplished without disturbing the position of the airship on even keel. All that is necessary is to decrease the angle of incidence of the aerofoils, an operation for which this invention provides. Thus as the airship proceeds upon a long voyage the dynamic lift which it employs is gradually reduced. For example, if the airship on reaching its initial altitude is 15 tons heavier than its gas buoyancy at that time and if the voyage requires the expenditure of fifteen tons of fuel and supplies it follows that the dynamic lift by aerofoils will be fifteen tons initially, gradually decreasing to zero at the end of the flight, at which point the discharge of a few pounds of cargo or ballast will render the ship statically light. It is also to be remarked that during such a voyage no cruising gas was wasted into the air, that the airship arrived at destination with substantially the full amount on board at rising, and that the purity of that gas has not deteriorated.

It is a feature of the invention that when the pressure of the flight gas falls to substantially that of the atmosphere, air is automatically pumped into the containers that at the moment of ascent held air or less valuable gas, so as to maintain the pressure of the flight gas slightly, but only slightly, above that of the surrounding atmosphere. A pressure great enough to give rigidity to the surface of the flight gas container would burst it, which must be avoided. Temperature conditions will change as the flight proceeds, and the gas will tend to expand and contract, the sun's direct rays being a powerful heater, which would cause further expansion of the gas, and the atmosphere at the elevation of flight being a powerful cooling agent which in time will cause contraction of the gas. To maintain the desired buoyancy, the ship has apparatus to stabilize the temperature of the gas at the will of the pilot.

Assuming that the ship has started with gas at the atmospheric temperature expected at the cruising altitude, which may be assumed to be 40 degrees F., the ship has means by which the heat of the exhaust gases of the engines, which is of a higher temperature, is utilized to add heat to the gas when necessary; and to that end radiators may be provided within or without the body envelope, and a circulating system for heating the gas of the containers, if such in any case proves desirable. In order that the sun may not heat the gas excessively and cause its wastage, the ship is provided with means for shading the body of it in the form of awnings spread above it. Said awnings may consist of aerofoils of the type used in airplanes, or suitable modifications thereof, which contribute dynamic lift, this being their primary function, as later herein set forth, the shading of the body being an incidental benefit.

If, however, such planes are insufficient or not suitably located, undesired heating effect of the sun may be provided against by a bath of atmospheric air flowing over the gas containers between them and the envelope enclosing them. Such a flow is arranged by providing openings in the body envelope through which air will be forced by the forward rush of the ship, and by providing suitable facilities for its flow through the airship, in the annular space between the row of containers and the body envelope, and having access also through air ducts to the sides of the gas containers, circulating between said containers and their covering bags, if such be provided, and escaping through suitable openings at the rear of the airship. Such intakes of air may be at intervals along the ship if desired. Heat transmitted to the gas by heat rays, from the sun, penetrating into the gas space will be removed from the gas by conduction through the material of the gas containers to the current of cooler air flowing by in contact with the outside surface of the container.

Operation of the apparatus thus provided will prevent, when flying at an altitude of constant barometer, the escape of gas, and will prevent its contraction with consequent reduction of buoyancy, so that the ship will arrive at its destination with its full original supply of gas substantially undiminished and unvitiated by the causes which have been set forth. In any case where the cooling of gas by such an air bath is insufficient, this will be because of the limited heat transferring surface of the gas container; speed of cooling can be increased by circulating the gas through coils of pipe which are exposed to the rush of cool air caused by the forward motion of the airship. For this purpose a fan or pump may be employed to circulate the gas, and the piping for this cooling process may be the same as that which is employed for heating the gas.

The apparatus thus far described will not provide fully for the management of a load greater than that which the gas contained on board can lift. To meet this aspect of the problem, the ship is provided with supplementary lifting means, which may be in part permanently and in part detachably connected to the ship, and which may comprise apparatus which may be operated by the forward drive of the ship, and also apparatus operating when the ship has no forward drive. To these ends the invention provides dynamic lift by aerofoils to which reference has been made hereinbefore comparable to the "planes" which are well known in connection with aeroplanes, forward and aft of the centers of buoyancy and of gravity of the craft. Preferably some or all planes are adjustable as to angle, for varying the dynamic lift when the ship is on an even keel. They help lift the ship and its super-burden; and may be used to set the ship with its keel approximately level, and to maintain it so, without the assistance of the horizontal rudder, thus enabling the ship to drive straight ahead with maximum benefit of its contour design.

These aerofoils may also be used to maintain the ship level in case the rudder becomes jammed out of its mid position. Taking the place of this dynamic lift (in whole or in part) when the forward drive of the airship is not operating, or is driving the ship at insufficient speed on the occasion of the starting of the flight, the invention provides detachable lifting means, which may be in the form of a supplementary tractor ship. This can aid the static lift, to-wit, the gas, to raise the ship with its super-burden to the cruising level and hold it up, proceeding with the ship under its independent power until the forward speed of the ship has made the dynamic lift of the aerofoils sufficiently effective, after which the tractor is detached and will return to the place of starting. Thereafter the ship can proceed safely on a long journey, and on an even horizontal keel, carrying a total weight substantially in excess of the lifting capacity of the lifting gas which is on board at the moment of ascending from the ground. This excess is carried by the dynamic lift provided by the aerofoils while the ship occupies in flight its normal horizontal position.

During the flight the changes of the relative positions of center of gravity and of center of buoyancy due to the moving about of persons and things tend to change the angle of the ship with respect to the horizontal. Heretofore this has caused ships to point above or below the desired horizontal course; and the rush of air against the inclined side, which is forward, tends to accentuate the inclination. Correction for this is attempted in the present state of the art by release of ballast or gas, or with the horizontal rudder. Movement of the rudder in turn introduces an element of drag, and an unbalanced vertical force which results in a change of elevation; so that actual inclination and the setting of the rudder are a compromise of evils, resulting in a reduction of speed below that possible at equal power if the ship were pointing in the desired or actual direction of flight. The discharge of gas and ballast to preserve trim are evils to be avoided if possible.

It is a feature of the present invention to set the angles of incidence of the aerofoils on the ship so as not only to produce, when the airship is on an even keel, the necessary dynamic effort to balance the disparity between the weight and static power, but also by these means to introduce a couple which will so nearly counteract in magnitude and direction any lack of balance existing between the gravity-buoyancy couple and the thrust-resistance couple, which are constantly acting on the ship, that the automatic stabilizer hereinafter described may produce an exact balance and maintain the airship on an even keel without resorting to the horizontal rudder for that purpose, and, in consequence, without introducing the drag and change of elevation which is introduced by the rudder when used for this purpose in airships as heretofore constructed. Thus the evil effects of pitching, including loss of speed, are eliminated.

Furthermore, this feature of the invention prevents the wastage of gas or of ballast as the case may be, which has been necessary in past practice to maintain an airship on an even horizontal keel and at a constant altitude in flight. Incidentally, the use of the automatic stabilizer dispenses with the need for the services of the pilot or operator who is in past construction kept busy manipulating the horizontal rudder to reduce the amplitude of the angle of pitching and of the members of the crew who are kept busy maintaining trim by discharging ballast and gas. If the crew work in three shifts this saves the weight and supplies of three horizontal rudder men, and probably as many as six gas and ballast men, commonly estimated, with equipment, at 300 lbs. each,—a total of 2700 lbs. Pitching oscillations hitherto experienced through various amplitudes, depending upon the skill of the horizontal rudder operator, with the horizontal axis dipping down or tipping up, are also avoided, and the keel maintained level automatically. The wastage of speed incidental to pitching and to flying the ship at a vertical angle to maintain constant elevation, the extra fuel consumed in driving the ship in a direction making a vertical angle with the true line of flight; the waste of gas and the decrease of carrying capacity because thereof, and the extra ballast which must be carried because of the wasting thus foreseen, are losses which are avoided by the invention. The prevention of these losses adds to the carrying capacity of the vessel for useful weight.

The invention goes further than this, however, and provides automatic means to control the trim of the vessel without attention of the navigating officer, and in so doing, introduces mechanical control more sensitive than the human powers for correcting the setting of the ship's controls, when change occurs in distribution of weights, uneven waste of gas or changes in propeller thrust, with resulting change of pitch of keel. This is accomplished by automatically altering the relative longitudinal positions of the center of gravity and the center of buoyancy, so that the couple of gravity-buoyancy will always balance the combined moments of all other couples acting simultaneously on the vessel, without introducing any force external to the ship. The horizontal rudder is then available to elevate and depress the ship as a whole without its use altering the trim of the vessel.

This is done according to the invention by causing a liquid to be moved automatically on board or a shifting of the gas from one container to another in such a manner that the amount of the gravity-buoyancy couple is constantly maintained equal and opposite to the resultant of all other couples acting on the ship. The direction of movement and the starting and stopping of the liquid or gas are determined by apparatus responding to the inclination of the keel from the horizontal or from such other angle as shall be determined. This, which reduces crew and supplies and adds further to the useful load and to the speed, safety, and economy with which the vessel may be operated, is accomplished by the automatic stabilizer actuated by gravity, upon any sufficient change in the inclination of the keel.

The invention reduces the necessity for the use of the horizontal rudder to relatively short periods to bring about changes in altitude while in flight and upon reaching the desired altitude permits the lifting or depressing effort of the horizontal rudder to be replaced by a change in the dynamic effort of the aerofoils which, being designed to produce great lift with small drift, are more efficient lifting surfaces than the flat, horizontal rudder. The invention also is used to control the movements of the horizontal rudder automatically so as to maintain the airship at an elevation at which a predetermined pressure of the atmosphere exists, by a barometric control, or in the alternative by pressure balance showing changes in the relative pressure of the contained gas and the surrounding atmosphere. These devices may be set to operate the rudder upon a change in elevation to maintain the altitude.

The invention also provides means for changing the buoyancy of the gas which is contained on board without resorting to or in addition to the heating and cooling means, by changing the volume of a part of the gas by subjecting it to more or less pressure. This is especially useful where it is desired to hold the ship lying "dead" in a particular elevation for a time. A part of the gas is provided with a container of sufficiently stout fabric to permit the placing of the gas under pressure. Such material is already well known in connection with non-rigid airships. There is a pump, whereby air may be forced into a flexible container capable of withstanding a substantial internal air pressure. This air container may be situated internal to the gas container, or, preferably, external thereto but confined with said gas container in a space the volume of which is less than the sum of the full capacities of both containers, and so situated as to cause within said stout container holding gas an internal gas pressure substantially equal to the pressure of said contained air.

By varying the volume of the contained air and its pressure, the volume of the contained gas may be increased or decreased, corresponding respectively to decreases and increases of its pressure with reference to the surrounding atmosphere, with the result that the volume of free atmospheric air displaced by said gas may be varied and in consequence the lifting power of the gas may be varied. When the airship begins to ascend from the desired elevation the volume of the contained gas is automatically contracted by increasing the pressure in the air container, and when the airship begins to descend from the desired elevation the volume of the contained gas is automatically expanded by reducing the pressure in the air container. Automatic means are provided to thus increase and decrease the volume of the contained gas so as to stabilize the airship at the desired elevation.

In non-rigid airships, in the present state of the art, air containers are used to maintain a constant difference between the pressure of contained gas and the pressure of the surrounding atmosphere to accomplish which the gas must be allowed to expand when the airship ascends and to contract when the airship descends. This operation is opposite to that which by this invention must be performed to stabilize the airship at a constant elevation. If there be two or more of such stout gas containers, the gas spaces thereof may be interconnected, and the air containers being interconnected, a single pump will serve for all. Similarly, the other gas containers may be connected by a header, so that the gas will automatically distribute itself at a uniform pressure through them. Preferably valves are provided which normally close the connection of each gas container to such a header, but which can be opened simultaneously. By these means the risk of loss of gas from all through damage to one is avoided, as substantial equality of distribution is maintained by opening the valves occasionally for a brief period.

Another feature of the invention relating to conservation of gas and ballast comes into operation as a means for compensating for the loss of weight due to consumption of fuel. Hitherto this has produced excess of buoyancy, which has required wastage of gas as the voyage proceeds. The invention provides for a gradual burning of the gas at times when the airship is statically light, assuming that a combustible gas such as hydrogen is employed, in a steady flame, producing steam, which is to be condensed and saved. Such combustion draws oxygen from the atmosphere (equal to eight times the weight of hydrogen consumed), and this oxygen becomes fixed and added to the other weight on board, a condenser and tank being provided to catch it. Thus the weight of hydrogen that must be disposed of to reduce buoyancy is saved in heavy form and multiplied, and in such form balances gas that would otherwise have to be discharged to balance lift against weight; and, by employing for this purpose apparatus which makes the product portable, the load of water that must be shipped as a part of the supplies can be reduced, thus, in turn increasing the useful load carrying capacity of the ship. The water thus manufactured is useful for ballast, and the use of the invention in airships used for military purposes would so add to buoyancy and ballast as to enable the airship to quickly rise above an identical ship not able to drop an equal amount of ballast. It is particularly important that the supply of both buoyancy and ballast shall be ample as the ship approaches a landing.

Some of the advantages of the hereinbefore described dynamic lift would fail of realization if the ship did not carry a load heavier than the amount of its static lifting force. It is another feature of the invention to make the carrying of such a load possible without the vessel coming thereby in danger of injury in descending when its forward speed is reduced and the dynamic lift of its planes thereby terminated. The invention provides that the cargo may be discharged by parachutes while the vessel is in the air and about to land, cargo selected for this purpose being mail bags which ordinarily could sustain the descent without injury, and with the definite advantage of the utmost promptness in delivery. The load having been reduced by this means, the vessel may descend with the requisite slowness and accuracy.

Automatic means are also provided for maintaining an airship during flight at such elevations that the pressure of the lighter-than-air gas in the gas containers of the airship is always a little greater than that of the surrounding atmosphere. If there is no change in the temperature of the gas, no gas leakage and no change in the barometric pressure, this automatic means will operate to maintain the airship at a constant altitude. Several important advantages are obtained thereby. In the first place, the airship is kept at all times in atmosphere of suitable pressure and this is done automatically without the wastage of gas and ballast. A second very important object attained is the prevention of the infiltration of air into the lighter-than-air gas within the containers, by the maintenance of the pressure of the gas slightly greater than that of the atmosphere. According to present methods of operation, when the gas pressure is greater than that of the atmosphere by a slight amount, gas is allowed to escape through a blow-off valve to prevent rupture of the gas bags; and when the pressure falls below that of the atmosphere, a partial vacuum exists within the gas bags, causing the passage of air through the interstices of the container, and resulting after a length of time in such deterioration that the entire quantity of gas becomes useless for airships and must be replaced by new gas having greater lifting power. In case the rare helium gas, which is non-inflammable and very costly, is used, this method of maintaining the purity of the gas by preventing the infiltration of air becomes of the greatest importance.

Improvement in connection with rudder control consists in providing a stop or limit so that a rudder may not be moved through an angle greater than that at which its maximum effect is produced. It is a rather frequent occurrence in the operation of aircraft according to existing methods that the horizontal rudder is thrown to a position at which the drift is increased without adding to the elevator effect of the rudder.

For convenience in housing the airship in a hanger of minimum size, some or all of these planes may be so fastened to the airship as to be readily detachable therefrom.

Taken in combination, the various features of the invention herein set forth provide for the greatly increasing of carrying capacity and speed of airships, conserving those elements of the ship which are vital to its safety, the gas and the ballast, providing for the management of the ship with a smaller supply than heretofore of both gas and ballast for a unit of weight transported over a given long voyage; conserving the quality of the gas, thereby making it an enduring and relatively permanent thing in a commercial sense; making airships possible for passengers in a commercial sense, because of the sureness of travel on an even keel; and from the stand-point of safety, whether in peril of natural forces or of a human enemy, giving it immeasurable superiority over ships heretofore proposed, because of the high "ceiling" which the ship of the invention may attain.

In the practical application of the invention thus set forth, various devices may be employed in substitution for those which are herein shown as illustrating the principles involved; and variations may be made in many respects without departing from the scope of the invention. It is intended that the patent shall cover, by suitable expression in the appended claims, whatever features of patentable novelty exist in the invention disclosed.

In the accompanying drawings which are more or less diagrammatic, Fig. 1 is a side view of an airship moored to a tower with a tractor aircraft above it;

Figure 2 is a sectional view of the airship to a larger scale, taken on line 2—2 of Fig. 1 and shows pivoted aerofoils;

Fig. 3 is a longitudinal section on line 3—3 of Fig. 2;

Fig. 4 is an end view of one of the side aerofoils of Fig. 2;

Fig. 5 is a side elevation of this aerofoil and shows how it may be detached from the airship;

Fig. 6 is a cross-section on line 6—6 of Fig. 5;

Fig. 7 is a side elevation of the stern of the airship and shows the horizontal and vertical rudders;

Fig. 8 is a plan view of the stern of the airship and shows the horizontal and vertical rudders;

Fig. 9 is a side elevation to a larger scale, taken on a line 9—9 of Fig. 8, and shows means for limiting the movement of the horizontal rudder;

Fig. 10 is another side elevation of the airship, showing general arrangement of apparatus for controlling the movement of the horizontal rudder;

Fig. 11 is a side elevation to a larger scale of the stern showing the horizontal rudder;

Fig. 12 is a plan view of same, and shows power-operated means for moving the horizontal rudder;

Fig. 13 is a sectional side view on line 13—13 showing said power-operated means;

Fig. 14 is a sectional side view to a larger scale, partly diagrammatic showing control apparatus for moving the horizontal rudder, actuated by variations in the inclination of the airship to the horizontal;

Fig. 15 is a sectional elevation on the same line as Fig. 13 showing in diagram the connections with the rudder sector and motor of part of a control apparatus actuated by variations in barometric pressure;

Fig. 16 is an elevation and diagram of the remaining parts of the same partly to a larger scale and with the lower portion showing a detail of this control apparatus on a still larger scale, the true position of this lower detail being at 96, at the top of the same figure;

Fig. 17 is a sectional view on line 17—17 of Fig. 16;

Fig. 18 is like 16, but using a series motor;

Fig. 19 is a cross-section of the airship showing gas containers, one of which is external to the other;

Fig. 20 is a side elevation of a portion of the airship, showing a power car with its propulsion engine and means for utilizing the heat of the exhaust gases therefrom to heat the gas contained within the airship;

Fig. 21 is a sectional view on line 21—21 of Fig. 20, showing also expansible bags external to the gas containers;

Fig. 22 is an elevation to a larger scale of the heating device utilizing the heat of the exhaust gases;

Fig. 23 is a plan view of same;

Figs. 24 and 25 are sectional elevations of the ends of a device for burning hydrogen gas and condensing into liquid water the water vapor formed thereby;

Figure 28:
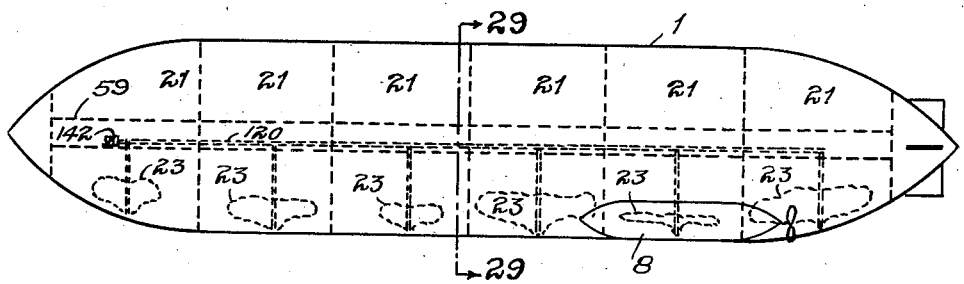
Figure 29:
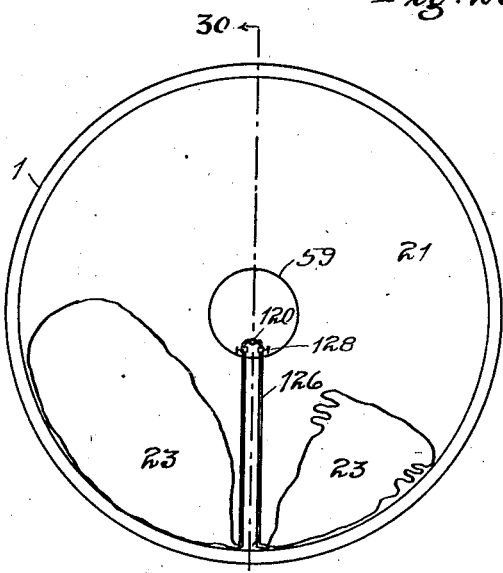
Figure 30:
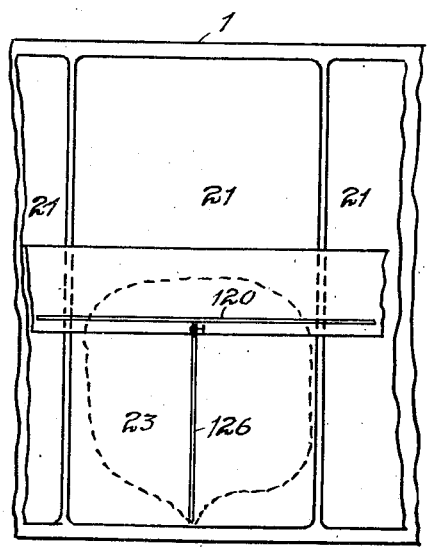
Figure 31:
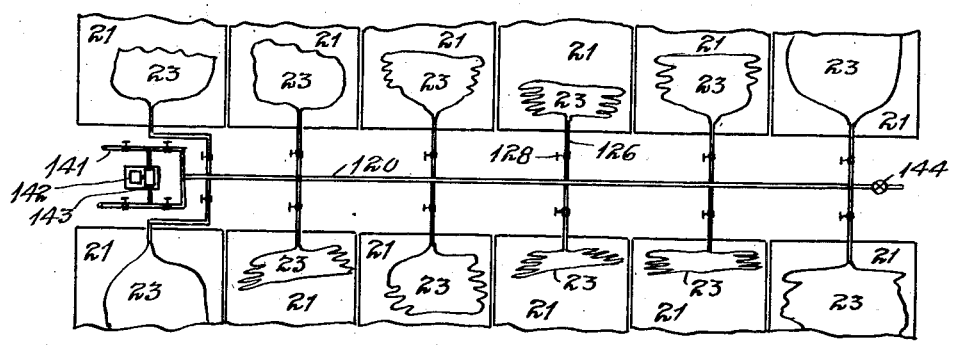
Figure 32:
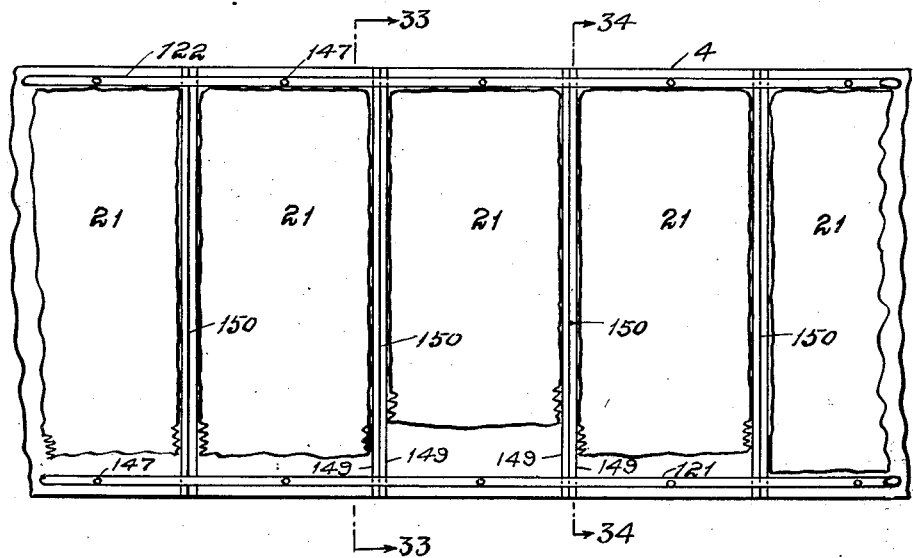
Figure 34:
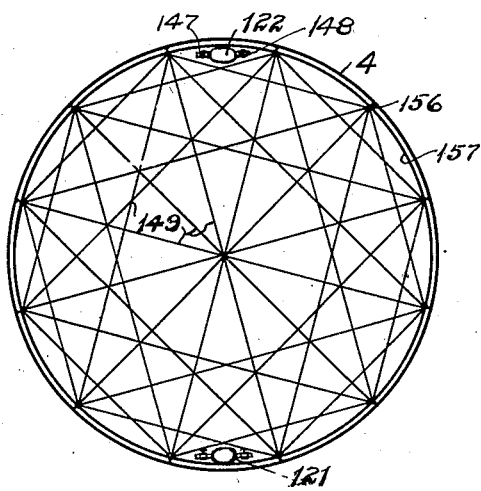
Figure 33:
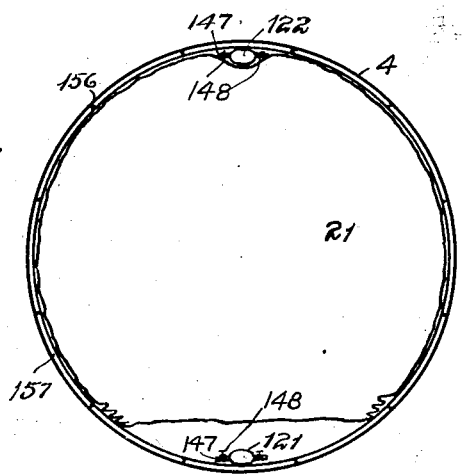

Figs. 26 and 27 are sectional views on lines 26—26 and 27—27 respectively of Fig. 24;

Fig. 28 is another side elevation of the airship showing gas containers and ballonets contained therein;

Fig. 29 is a sectional view to a larger scale taken on line 29—29 of Fig. 28;

Fig. 30 is a sectional view on line 30—30 of Fig. 29;

Fig. 31 is a diagrammatic plan view showing the gas containers, ballonets, piping system and means for controlling the flow of air into and out of the ballonets;

Fig. 32 is a sectional longitudinal elevation of the airship showing diaphragms enclosing the several gas bags in separate compartments, and air ducts for controlling the temperature of the gas in the gas bags;

Figs. 33 and 34 are sectional views on lines 33—33 and 34—34 respectively of Fig. 32.

Figure 40:
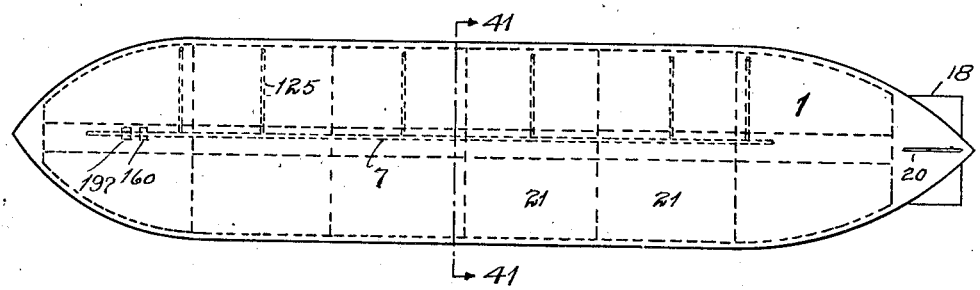
Figure 41:
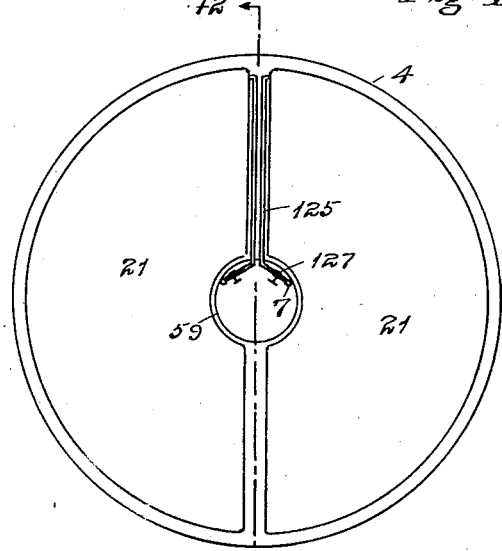
Figure 42:
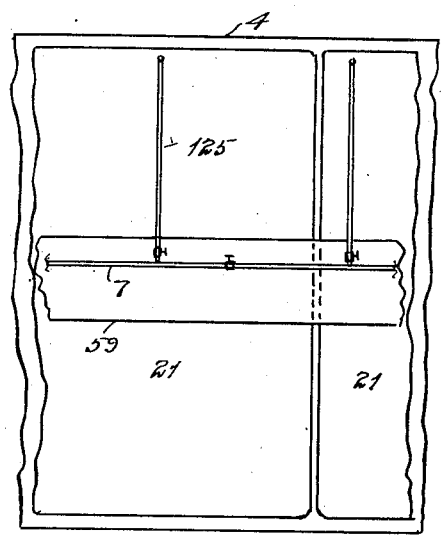
Figure 43:
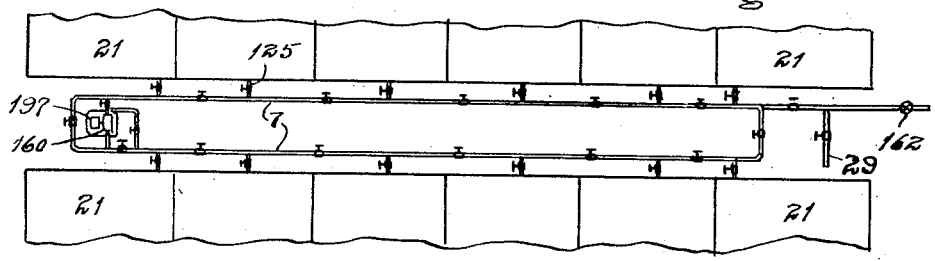

Fig. 35 is a side elevation of the airship showing means for cooling the gas by atmospheric air;

Fig. 36 is an end view of the bow of same, showing air intakes;

Fig. 37 is a sectional view on line 37—37 of Fig. 35;

Fig. 38 is a side elevation to a larger scale of one of the air intake openings, showing means for controlling the size of the opening;

Fig. 39 is a sectional view of same on line 39—39 of Fig. 38;

Fig. 40 is a side elevation of the airship showing the gas containers and means for transferring gas from one to another of said containers;

Fig. 41 is a sectional view to a larger scale taken on line 41—41 of Fig. 40;

Fig. 42 is a sectional elevation of same on line 42—42 of Fig. 41;

Fig. 43 is a diagrammatic plan showing the gas containers, piping system and control pump;

Fig. 44 is a side elevation of the airship showing system of stabilizing by shifting ballast, with an automatic control actuated by movement of a pendulum;

Fig. 45 is a side elevation to a larger scale, of one of the ballast tanks;

Fig. 46 is a side elevation, to a larger scale, of a motor-driven air compressor with air tank;

Fig. 47 is an end view of the pendulum with air valve;

Fig. 48 is a sectional view of the pendulum on line 48—48 of Fig. 47;

Fig. 49 is a sectional view of the air-valve on line 49—49 of Fig. 47;

Fig. 50 is a sectional view of same on a line 50—50 of Fig. 49;

Fig. 51 is a side elevation of another means for stabilizing the airship, actuated by variations in the surface level of a liquid in a container;

Fig. 52 is a sectional view to a larger scale of the liquid containers of the control apparatus;

Fig. 53 is an end view to a larger scale of the motor-driven piston and cylinder for moving ballast;

Fig. 54 is a side elevation of apparatus for stabilizing the airship, the control of which is actuated by variations in pressure of liquid in a container;

Fig. 55 is an end view, to a larger scale, of the motor-driven pump of the above apparatus;

Fig. 56 is a sectional view, to a larger scale, of one of the cylinders in the control apparatus;

Fig. 57 is a plan view, partly diagrammatic, showing parts of the control apparatus; and Figs. 58 and 59 are sectional views taken on line 58—58 and 59—59 respectively of Fig. 57.

In Figure 1, an airship 1 is shown moored by its bow end to a tower 2. The principal parts of the airship are the envelope 41, surrounding a structural frame having longitudinal members 42, and transverse members 43, bags or containers 21 for holding lighter-than-air gas, cars 9 for passengers and freight, power cars 8, internal combustion engines 25, propellers 44, vertical rudders 18 and horizontal rudders 20. In this figure are shown several improvements which are closely correlated and which taken together provide means for operating airships which greatly increase the safety and speed of flight and which at the same time make it possible for an airship to carry much larger loads than has been possible in the art as practiced hitherto. The improvements are shown somewhat diagrammatically in Fig. 1 and will be described in connection with other figures where they are shown more fully and in greater detail.

In Figure 2 aerofoils 12 over the airship 1 are pivotally supported by struts 14 and rotated about their axes 58 by means of ropes 15 leading around suitable sheaves 16 to a winch 17 by means of which the inclination of the aerofoils may be changed as desired. Similar aerofoils 13 may be attached to the sides of the airship. These may be so constructed, as shown in detail in Figs. 4, 5, and 6, that they may be readily detached in case it is desired at any time to make a flight without the aid of their lifting power, or when the airship is to be housed in a hangar having a width less than that of the airship and its wings. Means for rotating these aerofoils about their axes 56 is provided by the winches 53.

In Figures 7, 8 and 9 a stop 62 is shown for limiting the movement of the horizontal rudder 20 so that it may not be moved beyond the position at which its maximum deflecting effect is produced. In the drawings, this limit is shown as chains 62 extending between the forward edges of the rudder and the rear edges of fixed horizontal fins 19. It is evident that the same result may be accomplished in various other ways.

An automatic control for maintaining the airship in a horizontal position by means of the rudder is shown in Figs. 10, 11, 12, 13 and 14. Two vessels 71 are located on the airship a suitable distance apart longitudinally. These are connected by piping 72 with valves 73 to a cylinder 74 between them; in which there is movable a piston 76 with piston rod 77 carrying electrical terminals 78 which make contacts with fixed terminals 79. These terminals are connected by wire 80 to a source of power and to the motor 40.

The vessels 71, pipe 72 and cylinder 74 contain a fluid, preferably non-freezing and of high specific gravity, such as mercury. Pitching of the airship changes the relative elevation of these two vessels and produces a difference of pressure on opposite sides of the piston 76, causing movement thereof and resulting in actuation of the motor 40. A series of gears 68, 69 connects the motor to the quadrant 67, which is keyed to the shaft 66 of the horizontal rudders 20.

It will be seen that this control automatically operates to deflect the rudder, thereby producing a lifting or depressing force by the action of the wind against the rudder, to oppose and balance whatever other force is tending to change the relative altitudes of the tanks, i. e. to lower or raise the stern end of the airship with respect to its bow end. By settings the tanks at different elevations, which may be done by having a part of the pipe 72 flexible, any desired pitch may be made normal for the ship.

Figures 15, 16, 17 and 18 show details of an automatic control, actuated by changes in pressure, here represented as atmospheric pressure compared with a selected degree of vacuum. 85 and 86 are cylinders partially filled with a liquid capable of conducting electricity, and connected to each other by a pipe 93 capable of conducting the liquid. The top of cylinder 85 is open to atmospheric pressure at 89; and the top of cylinder 86 is connected by pipe 90 to a vacuum pump 92, and to a relief valve 91' by which the degree of vacuum in the top of this cylinder may be varied as desired. A float 94 in cylinder 86 is connected to a balancing weight 97 by a rope or chain 95 passing around a wheel 98. The turning of this wheel by the raising and lowering of the float causes the arms 102 within the switch box 96 to make contacts with the two posts 101 or the two posts 106, thereby reversing the direction of the electrical current at the armature of motor 40. A friction device 99 causes the shaft 107 and wheel 98 to move together unless prevented from so doing by the arms 102 striking the posts 101 or 106, after which the wheel rotates about its shaft. Groups of electrical terminals 110 in 86, and 111 in 85, are set with the individuals of each group at diverse levels in the sides of their cylinder, and wires having different resistances 112, at cylinder 86, or 113 at cylinder 85, reach these terminals through the magnetic circuit of the motor and provide means for strengthening the field by increasing the flow of current therethrough at greater amplitudes of variation in the level of the liquid, which correspond with greater amplitudes of variation in the atmospheric pressure from a predetermined normal.

Assuming that the horizontal rudder 20 of Figure 12, is in its mean position and that the float 94 is at the position shown, corresponding with a certain barometric pressure, selected as the normal which is to be maintained, if the barometric pressure falls lower, the liquid will rise in cylinder 85 and the float will fall correspondingly. This movement of the float will rotate the arms 102, making electrical connections between the segmental motor terminals 104, 104 and the posts 101, 101. When this has occurred and the liquid in cylinder 85 has risen into contact with the lowest terminal of wire 113, which is the one having considerable resistance, the motor 40 begins to turn slowly in such a direction that the forward edge of the rudder is thrown down, and there will be produced on its upper surface a vertical force of wind which will act to depress the airship. If not stopped by a reversal of direction of flow of the liquid, with consequent shift of arms 102, the motor rotates the rudder until it reaches its position of maximum effect when by the sector 67 having pulled one of the chains 65 taut, or otherwise, one of the two cut-out switches 108 is pulled open, breaking the motor circuit, apparatus for which is seen in Figure 15. This switch remains held open by the sector, until the latter moves back, so that it cannot be closed to start the motor back, but the tie 65 that opened the other switch 108 is now relaxed, and that switch, which is in parallel, can be and is closed by current through one of the wires 109 and its switch-closing solenoid 109' whenever the desired correction has been exceeded so that the liquid in 86 arrives at an elevation, as at the lowest terminal 112, where current can flow through the motor. The motor then runs in opposite direction to set the rudder the other way and so to elevate the airship, thus maintaining it approximately at an elevation where the atmospheric pressure equals the predetermined amount. In the wiring diagram Fig. 16 the shunt coils of the motor are 40'; and in Fig. 18 the series coils are 40''.

The vertical forces which are created by wind pressure against the rudder would rotate the air ship in a vertical plane unless balanced by other forces having a turning moment of equal amount and in an opposite direction. This is provided for in this invention by an automatic stabilizer which will be described later. If it is desired to use the apparatus of Figures 10–14 and of Figures 15–17 in the same ship they may be connected through separate motors to separate rudders. It is obvious moreover that in place of a rudder, in either case, motors may be connected to such other apparatus for accomplishing the same purpose as may be employed, as, for correcting the pitch, to pump gas or ballast to another part of the ship; and, for changing the elevation, to start the gas heating or cooling apparatus, or to change its pressure, in order to change the buoyancy of the ship. The last mentioned purpose, to change buoyancy, may be effected by the apparatus illustrated in Figure 16, the container 85 being connected through its pipe 89 to the gas within one of the gas containers and the gas space in container 86 being opened to atmosphere, or the reverse.

The automatic controls thus illustrated may be variously connected and applied, their utility not being limited to the particular applications which are illustrated in the drawings. It will be observed that each of these automatic controls is arranged to control the starting and stopping of a motor; and it is obvious that the motor might be any one of the various motors illustrated, that is, might be a motor serving any of the various functions which a motor may serve, by way of maintaining the desired condition of stability, elevation, gaseous pressure difference, etc. Thus a motor 40, controlled by the apparatus of Figure 14, to correct a pitching of the ship, may be applied to change any of the adjustable surfaces of the ship, as the rudder or the forward or rear aerofoils, or to change the location of liquid or of lifting gas on board. The application of this to change the rudder is chosen for illustration, but the motor 40 might be applied through a winch 17 to the forward or to the rear aerofoils; or might be the motor 197 (Figs. 53, 55) operating at 38 (Fig. 1) for shifting liquid between tanks 35, 36; or might be the motor for driving pump 160 (Fig. 43) to shift lifting gas between bags 21; or be the motor 142 (Fig. 31) to shift auxiliary air in bags 23. Likewise the motor 40 of Fig. 16, which is above described and is illustrated as being applied to a rudder for changing elevation of the ship, might be applied to any other device for the same purpose, as to the winches that control the aerofoils for raising or lowering the ship by dynamic guidance, or may be applied to change the buoyancy of the ship, serving in this respect as the motor which is marked 142 to operate a pump driving air into or from auxiliary bags in the compartment of lifting gas, for expanding or contracting the lifting gas; or could be applied as the motor 124, (Fig. 22) to change buoyancy by operating a blower driving hot air or gases past such compartment for changing the temperature of the lifting gas. Similarly the said automatic controllers may be made responsive to such suitable standards as may be selected, even though different from those specifically above described. Thus the apparatus of Figure 16 is responsive to change in differential of gaseous pressure; and although this has been above described as a differential between the local atmospheric or barometric pressure and a predetermined degree of vacuum (which may be regarded as corresponding roughly to a predetermined elevation), it may with certain advantages be made responsive to the change of differential between the pressure of the lifting gas on board and the pressure of the local atmosphere, as elsewhere herein explained, so as to maintain the ship at such an elevation or otherwise to maintain conditions so that the former will always slightly exceed the latter, thus tending to prevent infiltration of air into the gas. For illustrating these two, the same drawing, Figure 16, may serve for each. The only difference lies in the connections of the two chambers 85, 86, which are to be varied to suit whatever standard which is to be applied. Thus, to keep the ship at an elevation where the local atmospheric pressure is approximately the predetermined pressure in the container 86 of Figure 16, the connections (a) should be made, which are those above described and marked (a) at the top of Figure 16, viz: chamber 85 connected to atmosphere and chamber 86 connected to a predetermined degree of vacuum. Or, to maintain the conditions such that the pressure in the gas bags does not diminish, to the local atmospheric pressure, thus preventing infiltration of air into the gas bags, the connections employed would be, (b) connection of pipe 89 to the gas bag 21, letting container 85 be subject to the pressure of the lifting gas, while pipe 90 and chamber 86 are connected to local atmosphere through valve 91'. Thereupon, upon close approach of pressures in 85 and 86 toward equality, the liquid would rise in 85 and the controller would respond and operate in the manner hereinbefore described to set in motion its motor 40. And this motor might be connected either to rudder or to aerofoils or to gas heating pump 124 or otherwise so as to restore the desired relation of relative pressure of the lifting gas to local atmosphere.

In Figs. 19 and 21, the collapsible gas bags 21 are for holding lighter-than-air gas and the bags 22 are for holding air or an inferior quality of lighter-than-air gas, both of which bags 21 and 22 are contained within a limited space, the bags 22 being exterior to the bags 21. A header 7, with branch pipes 125 having control valves 127, connects the several gas bags 21. Similarly, a header 120, with branch pipes 126 having control valves 128, connects the several containers 22 for air or inferior gas.

In Figures 28, 29, 30 and 31, a similar arrangement of container is shown, except that the bags 23 are placed inside the bags 21. In the diagrammatic plan, Fig. 31, the header 120 leads to an air pump or fan 143, driven by a motor 142. By this means, air may be removed from or blown into any one of the bags 23, as desired, or bags 22 if that arrangement is installed to any extent, thereby expanding or compressing the gas in the containers 21, thereby increasing or decreasing the buoyancy of the airship.

At the beginning of a flight, these auxiliary bags (22, Figures 19, and 21; or 23, Figure 28) may be filled with an inferior and less expensive gas than that which fills the main gas bags 21. As the airship ascends to its cruising altitude, where the atmospheric pressure is less the gas in all the bags expands, and inferior gas from the auxiliary bags is permitted to escape into the atmosphere through a relief valve 144, Fig. 31.

This system of auxiliary bags is also used to maintain the pressure in the main gas bags slightly greater than that of the surrounding atmosphere, thereby preventing the inflow of air through the pores and interstices of the bags and thus maintaining the purity of the gas.

In Figs. 20, 21, 22 and 23, the power car 8 has an internal combustion engine 25 driving the propeller 44. The hot exhaust gases from the engine are led through a pipe 129 to an air heater 26, where they pass through a large number of small pipes 130 around which air is passed. This air after being thus heated is blown by a fan 123, driven by a motor 124, through a system of ducts 121, and is brought in contact with the outside surface of the gas bags 21, after which either it may be wasted into the atmosphere or it may be recirculated, being brought back to the heater by means of duct 122. In place of using the heat from the exhaust gases of the propulsion engines, or in addition thereto, air may be heated by burning fuel oil or hydrogen in an air heating device, the construction of which is a matter of common knowledge, and which accordingly is not here shown. Such a device may comprise a single or multiple burner of the type shown in Figures 24–27, arranged for its products of combustion to pass through an air heater of the type shown at 26 in Figures 22, 23, which it may enter through the tributary pipe 129′ contents of which pass into the heater through the engine exhaust pipe 129. The blowing of heated air over the surfaces of the gas bags heats the lifting gas contained therein and by expansion increases its lifting power.

In the present state of the art, increase in the lifting power of an airship is obtained in one or two ways. Either ballast is thrown overboard or the vessel is propelled with its body surface tipped up above the direction of flight. Both of these methods are objectionable from the standpoints of safety and of economy of operation.

The same apparatus shown in Figs. 20, 21, 22 and 23 may also be used for circulating cold air around the gas bags and thereby cooling the gas contained therein. For such an operation, the flow of exhaust gases through the tubes 130 is shut-off and cold air from the surrounding atmosphere is drawn through in its place. This shift from hot exhaust gases to cold air may be accomplished by a simple arrangement of piping and valves, not shown. For this purpose it is enough to direct the discharge of an ordinary atmospheric air blower into the pipe 129; and to discharge the exhaust of engine 25 through the pipe 129″ instead of the pipe 129, seen in Figure 23.

Although the advantages of applying the described method to the ship as a whole are notable, it is a further feature of the invention to apply the same method to the ship fractionally.

Figs. 32, 33 and 34 show the gas bags 21 of an airship separated from one another by double systems of wire 149 stretched transversely between points on the circular girders 157 or the longitudinal girders 156 which form the rigid frame of the airship. About midway in the spaces between each pair of adjoining gas bags are transverse diaphragms 150 which with the envelope 4 form compartments enclosing separately the several gas bags. Air ducts 121 and 122 with outlets (or inlets) 147 and control valve 148 together with air heating and cooling apparatus, a type of which is shown in Figs. 21, 22 and 23, provide means whereby heated air may be circulated around any one of the several gas bags, thus increasing the temperature of the gas contained within that particular bag and accordingly changing the position of the center of buoyancy of the airship as well as increasing its lifting power. In a similar manner, cold air may be circulated under control around particular gas bags, resulting in a shifting of the center of buoyancy and a decrease in the lifting power of the airship.

With such a device, capable of heating and cooling the lighter-than-air gas contained within an airship, it will be possible for the operator to change the buoyancy of the airship at will, without wasting either gas or ballast and without having to fly with surfaces inclined from the direction of flight. By this means, he will be able to change the buoyancy of the airship to meet the varying conditions of the atmosphere encountered, without wide fluctuations in altitude. Also, conversely, when from one cause or another, the equilibrium between the weight of the airship and its buoyancy is changed, the desired condition of equilibrium may be maintained by changing the temperature of the lifting gas. For instance, as the ship is lightened by the consumption of liquid fuel, the temperature of the lifting gas may be gradually lowered, and contracted accordingly, thereby taking on board in the space previously occupied by a part of the gas, a quantity of air and thus maintaining the airship at a constant weight. When the sun's rays tend to heat and expand the lifting gas, its temperature may be maintained constant by circulating cold air between the gas bags and the envelope of the airship. Another very important service may be accomplished by this apparatus for controlling the temperature of the lifting gas. A severe snow or sleet storm may put such a load of snow or sleet on an airship as to overcome all its buoyancy and force it to the earth. With this apparatus, as herein described, it will be possible to maintain the envelope at such a temperature as to cause all snow and sleet falling thereon to melt immediately.

Figures 24, 25, 26 and 27 show a device for burning hydrogen and for condensing the water vapor, resulting from such combustion, into liquid water. 29 is a pipe connecting with the header 7 (Figs. 1, 19, 40-43) connecting the several gas containers of the airship. 131 is a valve controlling the flow of gas through this pipe. The proper amount of air for the combustion of the hydrogen is received through the entrance funnel 133, the rate of flow being regulated by the valve 132. The concentric pipes 134 and 135 are provided with suitable tips for proper combustion, which is accomplished in the combustion chamber 136. From the combustion chamber, the water vapor resulting from the combustion flows through a long pipe 137 which is surrounded by a current of cold air. The vapor is thoroughly condensed and passing through the opening 138 into the gathering chamber 139 is led by pipe 30 to storage tanks 31 (Fig. 1) suitably located in the airship. The water thus obtained weighs nine times as much as the hydrogen consumed in its making.

By thus burning hydrogen to water a smaller quantity of gas is consumed than would otherwise have to be released and wasted to balance the weight of the liquid fuel consumed during flight. Also, the water thus formed is pure and suitable for drinking, cooking and other purposes, and a supply of liquid ballast is thereby obtained, without any reduction in paying load, as would be the case if the same quantity of ballast has been taken aboard at the start of the flight.

Figures 35, 36, 37, 38 and 39 show a means for cooling the lifting gas of an airship by admitting the cold air of the atmosphere under pressure due to flight, through openings 152 in the forward part of the airship, leading the air through ducts or passages between ribs 42 so that it passes over the surface of the gas containers, and permitting it to escape through openings 153 at the stern. This flow of cold air is controlled by changing the size of the openings 152, which in the arrangement shown is accomplished by rotary movement of the ring 151 having holes to correspond with those in the envelope 4.

In Figures 40, 41, 42 and 43, is shown a header pipe 7 with branch pipes 125 connecting the several gas containers 21 of the airship for equalizing the pressure of the gas in the containers. A blow-off valve 162 permits the escape of gas when the pressure exceeds the amount which the gas bags are built to withstand. Pipe 29 leads to the hydrogen burner shown in Figure 24. A pump or fan 160 driven by the motor 197 is so connected to the piping system that by means of it, gas may be transferred from any container to any other container. Whenever gas is thus transferred, the size of one gas container is increased and that of another decreased, and a larger quantity of air is displaced by one container, while a quantity of air is displaced by the other container smaller in volume than the space previously occupied by the container. The effect of such a transfer of gas is that of transferring from one position to another on the airship a quantity of substance equal in volume to that of the gas transferred and having as its specific gravity the difference between that of the gas and that of air. By thus transferring gas from one container to another, buoyancy instead of weights may be shifted, but with the effect of shifting weights, and the airship maintained thereby on an even keel or with its longitudinal axis at any desired angle to the horizontal. An automatic control of this gas shifting apparatus, which forms a part of this invention will be described later herein. Figures 54-59 illustrate one form which this automatic control may assume.

One or more of the gas containers may be built of stronger enclosing material than the others and gas may be compressed therein by the gas pump 160, thus decreasing the displacement of the airship. If it is previously in a condition of static equilibrium with the surrounding air, such an operation will cause the airship to descend to a lower altitude, and conversely, the escape of compressed gas from this stronger container to another container where the pressure is less will cause the airship to rise to a higher altitude. In this way, a simple and efficient means is provided for changing the altitude of the airship without waste either of gas or ballast and without flying the airship with its horizontal rudder inclined to the direction of flight, which methods are the means commonly employed in the art as at present practiced, for changing altitude.

Figures 44 to 50 inclusive show apparatus for stabilizing the airship against pitching, by the shifting of liquid, which may be liquid fuel, with an automatic control actuated by a pendulum. The tanks 35 and 36 are connected to each other by pipe 37 for the flow of liquid and by air pipes 171 and 174 to the air valve 172. From this latter, pipe 176 is an outlet and pipe 173 runs between the air valve and the compressed air tank 186. Conveniently located and connected with this tank is the compressor 184 driven by motor 185. The pipe lines are equipped with suitable cut-off valves 182 and check valves 181. A heavy pendulum 179 swings freely in the vertical longitudinal plane of the airship from the shaft 180 to which is also fastened the rotor 175 of the valve 172. The apparatus is simple in its operation and needs little explanation. When the bow of the airship is depressed for any reason, the supporting frame 177 swings to the left (Figure 48) as regards the pendulum, which remains vertical. Referring to Figure 49, the outer valve piece 172 rotates in a clockwise direction, permitting compressed air to pass from the port 173 to pipe 174 and thence to tank 36, but before this passage of air takes place, the valve makes a connection between pipe 171 and the exhaust 176, thus permitting compressed air to escape from tank 35. These port and exhaust openings are connected so that the size of the opening for passage of air varies with the amplitude of the swing of the pendulum, accordingly the greater the divergence of the airship from its normal position, the quicker will be the action of the stabilizer toward restoring it to its normal position.

Figures 51, 52 and 53 show stabilizing apparatus actuated by difference of surface level of a fluid contained in a duct having its ends bent up. 35 and 36 are two tanks containing liquid and located a distance apart longitudinally on the airship when used for stabilizing against pitching, and transversely for stabilizing against rolling. These tanks are connected by pipe 37, having suitable valves 190, to a pump 38. This is shown as a cylinder with a piston 191, although various other forms of pumps, as for example a rotary pump of simple and ordinary type, might be used equally well, and with some advantage because of its lightness. The piston rod 192 carries a rack 193 and is driven by a motor 197 through suitable gearing 194, 195, 196. In the arrangement of apparatus shown, the cylinder 38 and the tanks 35, 36 have approximately equal capacities and a single stroke of the piston is sufficient to remove practically all the liquid from one tank and to fill the other tank.

The automatic control of the stabilizer comprises a tube 204 having enlarged bent-up ends 198, 199 in one of which there is a float 200. This float carried a stem with rack 201, which operates a rheostat controller, which in turn controls the starting, stopping, speed and direction of rotation of the motor 197. Such a controller is well-known in the electrical art and further description of it and of the simple electrical connections is not deemed necessary. Assuming that the apparatus is installed to stabilize an airship against pitching, any displacement of the horizontal axis from the horizontal will cause a charge in the relative elevations of the surfaces of the fluid in cylinders 198, 199 with resulting movement of the float 200, and a corresponding rotation of the arm 202 of the controllers. A slight displacement will throw the controller to the first point of contact in such a direction that the motor will slowly operate the pump, and will shift a quantity of liquid from the tank at the end which is being depressed to the tank at the end which is being elevated, thus counteracting whatever forces are tending to displace the airship from its normal position, which in this assumed instance is taken as being horizontal. The control apparatus can readily be adjusted so as to stabilize a craft in a position with its axis inclined to the horizontal, when so desired.

Figs. 54, 55, 56, 57, 58 and 59 show an automatic control for stabilizing which possesses a number of improvements over those previously described. In this apparatus, the automatic control is obtained from variations of pressure or head of a liquid in containers 206 due to changes in the relative elevations of the containers 205 and 206 which are connected by a duct 207, such changes in relative elevation resulting from the divergence of a craft from its normal position with respect to the horizontal. Fig. 56 shows one of the containers 206 more in detail. The piston 230 has a piston rod 215 carrying a rack 210, which is adjustable thereon by means of the screw 227, Fig. 57. The pressure of liquid in the cylinder 206 works against a spring 208 and the position of the piston in the cylinder may be regulated by the screw 209 against which one end of the spring bears, the other end bearing against the piston. There are two of these cylinders 206, one of which operates a reversing switch 213 and the other, a rheostat 214, having several points of contact providing a series of varied resistances for both directions of rotation of the motor 197. Figs. 57 and 58 show this reversing switch and rheostat with a diagrammatic layout of wiring and the motor.

The operation of the automatic control is as follows:—Assuming the craft in its normal position with the reversing switch and rheostat arm in positions as shown and that the apparatus is for use in stabilizing an airship against pitching, and further, that tank 35 is located toward the bow and tank 36 toward the stern; if the bow starts to fall in relation to the stern, the pressure of liquid against the pistons 230, 230 in cylinders 206, 206 is decreased, the amplitude of change of head resulting from a given movement depending on the degree of fore and aft separation of the containers, whereupon the pistons are pushed to the left by the action of their respective springs 208. This movement of the pistons causes the switch arms 216, 217, to rotate to the right, making contact between terminals 220 and 224 and between 223 and 225, and revolves the armature of the motor 197 in a clockwise direction. This forces the piston 191 to the right, thus removing liquid from tank 35 and adding liquid to tank 36. Simultaneously with the throwing of the switch, the rheostat arm 212 is thrown to the first point of contact, thus closing the circuit and providing a maximum stage of resistance in the circuit. If the disturbing force is large and applied suddenly, as for instance would result from the dropping of a considerable weight from one end of the airship, it is desirable that the stabilizing apparatus shall act quickly and such action is obtained in this improvement by speeding up the motor, this being caused by an increase in current, resulting from the cutting out of resistance by the increased movement of the rheostat arm.

If on such a disturbance of the airship from its normal position with relation to the horizontal, the counter-balancing forces thus brought into action were only sufficient to statically balance the disturbing force, the airship would continue in its movement away from the normal position, due to the inertia of the moving mass. Accordingly, it is necessary to provide against this by overbalancing the disturbing forces, and this it will be readily seen is done by the apparatus here shown. Unless special provision were made to prevent it, such overbalancing would cause the airship to swing back past its normal position and repeated pitching of the ship would result. This improvement makes provision against such oscillatory pitching. As soon as the airship starts to swing back toward its normal position after being thus overbalanced, the switch arms are thrown back against posts 221, and 222, connecting terminal 222 to 224 and 221 to 225, thus reversing the direction of current through the motor and causing the armatures to move counter-clockwise. This causes the shifting of fluid in an opposite direction and at a rate which is automatically decreased as the airship approaches its normal position. It should be noted that owing to the difference in radii of the switch pinion 211 and the rheostat quadrant 212, the pinion rotates faster and through a much greater arc than does the quadrant. This gives a quick reversal of the current, and after an arm 216 comes in contact with a terminal post 220 or 222, the pinion shaft continues to rotate, the arm slipping thereon. Such slipping is easily provided for by a screw 231 with spring and friction block, not shown, bearing against the shaft, or by other friction devices well-known in the art.

The effect obtained by this improvement is that a true, dead-beat stabilizing action is produced, one which always acts in a direction contrary to that of the disturbing force, and at a rate proportional to the degree of disturbance.

In Figures 51 and 54 the vertical line M—M signifies the vertical axis of the ship,—and the tanks 35, 36 on opposite sides of it illustrate the arrangement whether the tanks be at opposite sides of the ship, arranged for lateral balance, or be at opposite ends of the ship, arranged for longitudinal balance.

The operation of the improved automatic control devices herein shown is independent of the nature of the medium shifted to correct the inclination of the ship, whether it be liquid as illustrated; or be gas, as in Figures 40–43 thus obviating the carrying of the liquid with pump and containers required for a stabilizer using liquid; or even be a movable solid. Moreover these automatic stabilizers may be arranged to prevent transverse listing of a vessel rolling as well as disturbance of the longitudinal axis. And the device is applicable regardless of the medium in which the vessel may be floating for it can be arranged to correct a vessel wholly immersed in air, as an airship; or in water, as a submarine; or floating partly in air and partly in water.

A feature of the invention shown in Fig. 1 and not shown elsewhere in detail is that of an auxiliary aircraft or tractor ship 4 to be used for assisting in the lifting of an airship 1 at the start of its flight when such airship is loaded so as to be heavier than the air displaced thereby. This tractor ship may be equipped with helicopters 10 for increasing its lifting power, or it may derive the lifting power, which is required in excess of its own weight, from lighter-than-air gas, which may be of an inferior quality, not adapted for use in the cruising airship, and which after serving its purpose of lifting the excess weight of said airship may be wasted into the atmosphere. Another economical method for accomplishing this same object is provided for in this invention, and consists in the heating of the gases contained within the tractor-ship to provide this required extra buoyancy, or these several methods may be combined to produce the required result. After thus lifting the heavier-than-air cruiser and attaining such speed that the aerofoils of the cruiser will thereafter provide the requisite lifting power, the connections 5 between the two vessels are cast loose and the tractor ship returns to its station, while the cruiser proceeds on its way.

In cases where the aerofoils are arranged at the top of the ship and the propellers are wholly at the bottom as indicated in Figure 1, it may be found that the drag of the aerofoils introduces too great a turning moment. If this be so, or if it be desired for other reasons, one or more propellers set on longitudinal axes may be arranged at the level of the aerofoils. These (not shown) may be either driven from adjacent engines like the propellers 44, and the helicopters 10, or may be driven by power transmitted from engines below by mechanism of well known type. The thrust thus imparted to the ship, and the thrust and drag imparted by various other portions of the equipment, which may in some cases be so far from the axis of the ship as to exert a rather powerful leverage, are integrated in the ensemble of forces acting on the ship which as a whole is balanced by the stabilizer hereinbefore described so as to maintain the ship pointing on an even keel or in desired line of flight.

We claim:

1. The combination, with an airship supported partly by lighter-than-air gas and partly by the upward pressure of air against adjustable surface on said airship, said surface having separated parts distributed longitudinally of the ship, of means for changing the angles of incidence of separate parts of said surface to the axis of the ship; automatic means for maintaining the airship with its longitudinal axis approximately at a predetermined relation to the horizontal; and other means for operatively steering the ship up and down.

2. The combination, with an airship supported partly by lighter-than-air gas and partly by the upward pressure of air against adjustable surface on said airship, of means for changing the inclination of said surface to the horizontal independently of the ship's axis, and an automatic device controlling said means, apparatus actuating said device, wherein local and varying atmospheric pressure is opposed to a gas under a predetermined and constant degree of vacuum, whereby said airship is maintained at elevations above the earth's surface where the barometric pressure is a predetermined amount.

3. The combination with an airship supported partly by lighter-than-air gas and partly by the upward pressure of air against adjustable surface on said airship, of means for changing the inclination of said surface to the horizontal independently of the ship's axis and an automatic device, controlling said means and actuated by changes in the pressure of said lighter-than-air gas, whereby said airship is automatically maintained at such elevations above the earth's surface that the pressure of said gas is maintained within predetermined limits.

4. In equipment for stabilizing a vehicle for propulsion while wholly or partly submerged in a medium of flotation, the combination with said vehicle of two holders for a quantity of substance, one of which holders is located nearer one end of the vehicle than is the other; a quantity of substance held by each; means for causing said substance to move from each of said holders to the other; and an automatic controller for said means, responsive to changes from the normal in the relative elevation of the two ends of the vehicle, whereby substance is thus moved from the holder located toward that end of the vehicle which is moving downward with respect to the other end, while said end is moving downward, except when the two ends occupy their normal elevation with respect to one another; said controller being adapted to cause the rate at which said substance is moved to increase and to decrease respectively as an end of the vehicle moves away from and toward its normal elevation with respect to the other end.

5. In equipment for stabilizing a ship immersed in a fluid, the combination of two tanks for liquid attached to said ship, one toward its bow and the other toward its stern end; a pipe connecting the two tanks, through which pipe said liquid may flow back and forth between the two tanks; a quantity of said liquid in the system; a cylinder, operatively connected to the system; a piston movable in the cylinder and adapted to withdraw liquid from one tank and supply liquid to the other tank simultaneously; and means responsive to changes in altitude between the bow and stern of the ship for effecting actuation of said piston; and suitable pipe connections; substantially as described, whereby, due to the shifting of weight of the liquid between the two tanks, the ship is automatically stabilized.

6. In equipment for stabilizing a ship immersed in a fluid, the combination of two tanks for liquid attached to said ship, one toward its bow and the other toward its stern end; a single line of pipe connecting the two tanks, through which pipe said liquid may flow back and forth between the two tanks; a quantity of said liquid in the system; and means operable in either direction for controlling the flow of liquid between the two tanks, comprising pressure exerting means and control means, governing it, responsive to changes in altitude between the bow and stern of the ship, whereby, due to the shifting of a quantity of liquid between the two tanks, the ship is stabilized and may be automatically maintained in a position in which its longitudinal axis makes an approximately constant angle with the horizontal.

7. In equipment for stabilizing a ship wholly immersed in a fluid medium, means to change the relation to each other of the points of incidence upon the ship of the static forces of buoyancy and gravity of the ship, and a controller therefor having actuating means comprising a fluid and a container for the fluid extending in the direction in which stability is to be maintained, said actuating means being responsive to the change in pressure of the fluid against walls of its container which is consequent upon a disturbance of stability, said static forces being considered in their relation as if the ship were stationary in its said fluid medium, and the said disturbance of stability being the occurrence of such a relation which differs from a predetermined normal.

8. In equipment for stabilizing a ship wholly immersed in a fluid medium, the combination, with a plurality of connected tanks on opposite sides of an axis of the ship, of means for transferring liquid from one to another of the tanks, to and from opposite sides of said axis; and automatic control means for the said transferring means, comprising a duct and a fluid therein extending between locations remote from each other on opposite sides of said axis of the ship, and with ends elevated whereby the respective hydraulic heads of the ends oppose each other with the said controller inactive when the said fluid is in the position in the duct which corresponds to a predetermined equilibrium of the ship; whereby a departure of the ship from its said equilibrium changes the relations of said heads and so actuates the controller for automatic transfer of fluid to return the ship to normal equilibrium, 9. In equipment for airships supported by lighter-than-air gas in containers, the combination of power-operated means to change the conditions affecting the said gas, combined with an automatic controller for said means; the said controller having parts severally exposed to the gas pressure and to atmospheric pressure and being responsive to change of differential between these two pressures.

10. In equipment for stabilizing a ship, wholly immersed in a fluid medium, the combination with the liquid supply system of the ship of mechanical means for transferring said liquid from one to another of the various tanks of said supply system and an automatic control of said means comprising a conduit so placed that one of its ends is nearer the bow of the ship than is the other end, a quantity of liquid in said conduit, and means actuated by changes in hydrostatic pressure of the liquid in the conduit for controlling the operation of said transfer means.

11. In equipment for stabilizing air ships, a stability-controlling body of liquid arranged on the ship so as to be moved by gravity relative to the ship, when the angle of the air ship with respect to the horizontal changes, combined with apparatus, operatively controlled by the position of said body with respect to the ship, for moving another substance on the ship and thereby changing the relation of the center of gravity of the total weight supported by the buoyancy of the lighter-than-air gas contained in the airship with respect to the structure of the airship in such manner as to bring the vertical axis of the airship automatically to its normal position with respect to the horizontal when displaced therefrom, thereby automatically stabilizing the airship.

12. A stabilizing device for a vehicle which moves normally without solid support embracing two containers for liquid supported on the vehicle toward opposite ends of an axis thereof, a pipe connecting the containers, a quantity of liquid in said pipe and containers, power operated means for causing said liquid to flow from each of said containers to the other, and an automatic control thereof comprising a duct for liquid, extending crosswise of said axis, a second quantity of liquid in said duct, and means, actuated by changes in hydrostatic pressure of the liquid in said duct, for controlling said power operated means.

13. A stabilizing device for a vehicle which moves normally without solid support embracing two containers for liquid supported on the vehicle relatively nearer to and further from an end thereof, a pipe connecting the containers, a quantity of liquid in said pipes and containers, power operated means for causing said liquid to flow from each of said containers to the other, and an automatic control thereof comprising a duct for liquid, a second quantity of liquid therein, and means, actuated by changes in hydrostatic pressure of the liquid in said duct, for controlling said power operated means.

14. A stabilizing device for a vehicle which moves normally without solid support, embracing a liquid-containing enclosure on the vehicle, and liquid therein extending in a direction diametric to the circle in whose plane rotation is to be prevented; power-operated means for shifting said liquid back and forth in said diametric direction; and an automatic control thereof comprising a duct for liquid extending in the same diametric direction, a second quantity of liquid therein, and means, actuated by changes in hydrostatic pressure of the liquid in said duct, for controlling said power-operated means.

15. In equipment for stabilizing an airship while moored, the combination of a quantity of liquid supported by said airship; means for changing the position of said liquid with respect to said airship and guiding its movement to a different position on the ship, whereby the moment of the couple produced by the forces of gravity and buoyancy acting on the airship and its contents is varied so as to oppose and overbalance the moment of the couple produced by the stress in the mooring attachment and the disturbing force, when the airship is disturbed from its normal position with respect to the horizontal; said first mentioned moment being adapted to oppose and balance the second said moment when the airship is in its normal position; an automatic fluid actuated control of said means, and means whereby the control is actuated by a uni-directional unbalanced force which is balanced when the ship is in its normal position with respect to the horizontal.

16. In equipment for stabilizing a vessel adapted for propulsion through a medium of flotation, the combination of a quantity of liquid contained within said vessel; means for changing the position of said liquid in said vessel and guiding its movement to a different position on the vessel, whereby the moment of the couple produced by the forces of gravity and buoyancy acting on the vessel is varied so as to oppose and overbalance the moment of the couple produced by the forces of propeller thrust and the pressure of the medium of flotation against the vessel when the vessel is disturbed from its normal position with respect to the horizontal, said first mentioned moment being adapted to oppose and balance the second said moment when the vessel is in said normal position; and an automatic fluid actuated control of said means, and actuating means therefor arranged and adapted to be shifted in position by a force such as gravity, normally balanced but left unbalanced upon said disturbance of vessel from normal position and thereby to actuate the said control.

17. In equipment for stabilizing a vehicle adapted for propulsion while wholly or partly submerged in a medium of flotation, the combination with the vehicle of two containers adapted for holding a quantity of matter, one of which containers is located nearer one side of the vehicle than is the other; a quantity of matter in said containers; a single conduit connecting said containers; means for causing said matter to move through said conduit from each of said containers to the other; and an automatic controller of said means whereby matter is thus moved from the container located toward one side of the vehicle when that side is moving downward with respect to the other side of the vehicle; said controller having means for reversal of its action with reversal of the direction of said downward moving side of the vehicle.

18. In equipment for stabilizing a vehicle adapted for propulsion while wholly or partly submerged in a medium of flotation, the combination with said vehicle of two containers adapted for holding a quantity of matter, one of which containers is located nearer one side of the vehicle than is the other; a quantity of matter in said containers; a single conduit connecting said containers; means for causing said matter to move through said conduit from each of said containers to the other; and an automatic control of said means whereby matter is thus moved from the container located toward that side of the vehicle which is moving downward with respect to the other side, while said side is moving downward, except when the two sides occupy their normal elevation with respect to one another, and means whereby the rate at which said substance is moved increases and decreases respectively as a side of the vehicle moves away from and toward its normal elevation with respect to the other side.

19. In equipment for stabilizing a vehicle adapted for propulsion while wholly or partly submerged in a medium of flotation, the combination with the vehicle of means for holding a quantity of matter the longer extent of which runs lengthwise of the vehicle; means for causing said matter to move lengthwise of the vehicle; and an automatic fluid actuated control of said movement whereby the matter is thus moved toward one end of the vehicle when that end is moving upward with respect to the other end of the vehicle; said control having an element actuated by direction of relative movement, whereby the said matter begins to be moved in reverse direction when reversal of relative movement of said ends of the vehicle occurs.

20. In equipment for stabilizing a vehicle adapted for propulsion while wholly or partly submerged in a medium of flotation, the combination with the vehicle of means for holding a quantity of matter the longer extent of which runs lengthwise of the vehicle; means for causing said matter to move lengthwise of the vehicle; and an automatic control of said movement whereby the matter is thus moved toward one end of the vehicle when that end is moving upward with respect to the other end of the vehicle, said automatic control comprising means whereby the rate at which said substance is moved increases and decreases respectively as an end of the vehicle moves away from and toward its normal elevation with respect to the other end.

21. The combination with an airship supported partly by lighter-than-air gas and partly by the upward pressure of air against adjustable surfaces on said airship, of means for changing the inclination of said surfaces to the horizontal while the airship is on an even keel, an automatic control of said apparatus which actuates said automatic control and is itself exposed to the pressure of said gas and also exposed to the pressure of local atmosphere, and is responsive to changes of differential between these two last said pressures, whereby said airship is automatically maintained at such elevations above the earth's surface that the pressure of said gas is maintained within predetermined limits.

22. The combination with an airship supported partly by lighter-than-air gas and partly by the upward pressure of air against adjustable surfaces on said airship, of means for changing the inclination of said surfaces to the horizontal, while the airship is on an even keel, and an automatic control of said means whose actuation is caused by departure of the local atmospheric pressure from a predetermined standard of gaseous pressure, whereby said airship is maintained at elevations above the earth's surface where the barometric pressure is a predetermined amount.

23. In equipment for airships supported by lighter-than-air gas in containers and having a pivoted horizontal rudder, the combination of power-operated means for turning the horizontal rudder of an airship and an automatic control thereof, actuated by slight changes of pressure of the gas in the gas containers of said airship, whereby vertical forces are exerted by the pressure of the air upon the horizontal rudder thereby to maintain the airship at such elevations above the earth's surface that the pressure of the gas in the containers is kept within predetermined limits.

24. In equipment for airships supported by lighter-than-air gas in containers and having a pivoted horizontal rudder, the combination as in claim 23 together with a duct system connecting said containers and adapted for the free flow of gas from each of said containers to the other, whereby the pressure of gas in said containers is equalized.

25. In equipment for airships supported by lighter-than-air gas in containers and having a pivoted horizontal rudder, the combination as in claim 23 further characterized by the automatic control comprising a vessel adapted for holding liquid, a quantity of liquid therein capable of conducting electricity, whose surface level is changed by changes in the pressure of gas in the containers, a source of electric power, and suitable electrical terminals and connections.

26. The art of conserving and preserving purity of lifting gas in airships having lighter-than-air gas in containers, comprising the partial filling of each of several containers of an airship with the gas; said gas, previous to the launching of the airship from its mooring, being at a temperature higher than that of the surrounding atmosphere; the filling of remaining space in the several containers by collapsible receptacles containing air; the launching of the airship, with gas thus at higher temperature adjoining receptacles containing air; the removal of air from the receptacles, permitting expansion of the gas within its containers, upon decrease of atmospheric pressure; the introduction of air and removal of air, to and from the receptacles during flight, for maintaining the gas containers fully inflated at all times; the maintaining of an excess of pressure of the gas over the air for preventing the infiltration of air through the coverings of the gas containers into the gas; and the lowering and raising of the temperature of said gas during flight for adapting its lifting power to the changes in weight of the ship.

27. The art of conserving lifting gas in airships having lighter-than-air gas in containers, comprising the partial filling of the gas containers of an airship with lighter-than-air gas at a temperature exceeding that of the surrounding atmosphere, and the launching of the ship in this condition; the filling of the remainder of the space in the gas containers by collapsible receptacles containing air; the maintaining of said containers fully inflated at all times during flight by introducing or removing air while maintaining the quantity of gas constant; and the altering of the temperature of the said gas during flight, for maintaining the ship in static balance.

28. The art of conserving lifting gas in airships having lighter-than-air gas in containers, comprising the partial filling of the gas containers of an airship with lighter-than-air gas heated to a temperature higher than that of the surrounding atmosphere, previous to the launching of the airship at the start of a flight; the launching of the airship with its gas thus heated; and the heating and cooling of said gas while substantially its entire quantity remains contained within the said containers, filling them to varying degrees, during a flight of the airship, thereby increasing and decreasing the lifting power thereof.

29. The art of conserving the lifting gas in airships supported by lighter-than-air gas in containers, comprising the partial filling of the containers of an airship with lighter-than-air gas; the loading of the airship before the start of a flight so that its gross weight is greater than that of the air which it displaces when the gas in its containers is at the temperature of the surrounding atmosphere; the expansion of this gas by raising its temperature at the beginning of a flight so that the gross weight of the airship is less than that of the air which it displaces; and the control of the temperature of said gas during flight.

30. Apparatus for preventing the infiltration of air into the gas containers of an airship, comprising power-operated means for turning the horizontal rudder of the airship; and an automatic control thereof, actuated by differences of pressure between that of the gas in the containers and that of the surrounding atmosphere, whereby the horizontal rudder, by raising and lowering the airship, maintains it at elevations where the barometric pressures are slightly below the gas pressure.

31. Apparatus for preventing the infiltration of air into the gas containers of an airship as specified in claim 30, said automatic control comprising a vessel adapted for holding liquid, and one end of which vessel is open to the pressure of the gas in the containers and the other end open to the pressure of the atmosphere; a quantity of liquid therein, capable of conducting electricity, whose surface level is changed by differences of pressure between gas and atmosphere; a source of electric power, and suitable electrical terminals and connections whereby the electric power actuates the rudder control at predetermined liquid levels.

32. Apparatus for preventing the infiltration of air into the gas containers of an airship, comprising a plurality of collapsible receptacles placed within the gas containers and adapted for holding air; a duct system connecting said receptacles; air-moving means; and an automatic control for said means, actuated by difference of pressure between the pressure of the gas in the containers and that of the atmosphere.

33. Apparatus for preventing the infiltration of air into the gas containers of an airship as specified in claim 32, said automatic control comprising a vessel adapted for holding liquid, one end of which vessel is open to the pressure of the gas in the containers and the other end open to the pressure of the atmosphere, a quantity of liquid therein, capable of conducting electricity, whose surface level is changed by differences of pressure between gas and atmosphere, a source of electric power, and suitable electrical terminals and connections, whereby the electric power actuates the air-moving means at predetermined liquid levels.

34. Apparatus for preventing the infiltration of air into the gas containers of an airship, comprising a collapsible receptacle placed within a gas container and adapted for holding air, means for causing atmospheric air to flow into said receptacle, and an automatic control of said means, actuated by differences of pressure between the pressure of the gas in the container and that of the atmosphere.

35. Apparatus for preventing the infiltration of air into the gas containers of an airship as specified in claim 34, said automatic control comprising a vessel adapted for holding liquid, one end of which vessel is open to the pressure of the gas in the containers and the other end open to the pressure of the atmosphere, a quantity of liquid therein capable of conducting electricity whose surface level is changed by differences of pressure between gas and atmosphere, a source of electric power, and suitable electrical terminals and connections, whereby the electric power actuates the means causing air to flow at predetermined liquid levels.

36. In equipment for stabilizing airships supported by lighter-than-air gas in containers, the combination of a system of ducts connecting the interiors of the gas containers of an airship with one another, means for transferring gas through said ducts between said containers, and an automatic control of said transfer means, actuated by the divergence of the airship from its normal position with respect to the horizontal, whereby gas is automatically transferred between said containers, thus shifting the center of buoyancy and maintaining the airship in an approximately constant position with respect to the horizontal.

37. In equipment for stabilizing airships supported by lighter-than-air gas in containers, the combination of a system of ducts connecting the interiors of the gas containers of an airship with one another; power-operated means for causing gas to flow through said ducts between said containers; and an automatic control thereof comprising a duct for liquid, a quantity of liquid therein and means, actuated by changes in the hydrostatic pressure of the liquid in said duct, for controlling said power-operated means.

38. In an airship having lighter-than-air gas in containers through which gases may pass by osmosis, means for maintaining the purity of the said lighter-than-air gas comprising mechanism whose operation alters the pressure relation between said gas and the atmosphere; and automatic means for setting said mechanism into operation, having a control device which is responsive to change of relative pressure of said gas and of the atmosphere so as to prevent the pressure of the gas from falling to the simultaneously existing atmospheric pressure.

Signed at New York, N. Y., this first day of July, 1921.

WILFRID V. N. POWELSON.
WARREN TRAVELL.